United States Patent
Tang et al.

(10) Patent No.: US 12,401,740 B2
(45) Date of Patent: Aug. 26, 2025

(54) SOUND PICKUP METHOD FOR TERMINAL DEVICE THROUGH BLUETOOTH PERIPHERAL AND TERMINAL DEVICE

(71) Applicant: HONOR DEVICE CO., LTD., Shenzhen (CN)

(72) Inventors: Nengfu Tang, Shenzhen (CN); Yongmin Niu, Shenzhen (CN); Shuaiqi Wang, Shenzhen (CN); Pengfei Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 53 days.

(21) Appl. No.: 17/793,589

(22) PCT Filed: Jan. 10, 2022

(86) PCT No.: PCT/CN2022/071055
§ 371 (c)(1),
(2) Date: Dec. 22, 2022

(87) PCT Pub. No.: WO2022/262262
PCT Pub. Date: Dec. 22, 2022

(65) Prior Publication Data
US 2023/0370541 A1   Nov. 16, 2023

(30) Foreign Application Priority Data
Jun. 16, 2021   (CN) .................. 202110665714.4

(51) Int. Cl.
*H04M 1/72433* (2021.01)
*H04M 1/60* (2006.01)
*H04M 1/72412* (2021.01)

(52) U.S. Cl.
CPC ..... *H04M 1/72433* (2021.01); *H04M 1/6066* (2013.01); *H04M 1/72412* (2021.01)

(58) Field of Classification Search
CPC .......... H04M 1/72433; H04M 1/6066; H04M 1/72412; H04M 1/6008; H04M 2250/02; H04W 76/14; H04W 4/80; Y02D 30/70
See application file for complete search history.

(56) References Cited

U.S. PATENT DOCUMENTS 10,104,147 B2    10/2018   Schmidt et al.
11,109,138 B2    8/2021    Gong
(Continued)

FOREIGN PATENT DOCUMENTS

CN    105827849 A    8/2016
CN    205754811 U    11/2016
(Continued)

*Primary Examiner* — Farid Seyedvosoghi
(74) *Attorney, Agent, or Firm* — Fish & Richardson P.C.

(57) ABSTRACT

This application provides a sound pickup method for a terminal device through a Bluetooth peripheral and a terminal device. The terminal device may pick up sound data through a microphone of the Bluetooth peripheral, and may perform targeted sound effect processing on the sound data picked up by the Bluetooth peripheral by using a preset sound effect DRC parameter corresponding to the Bluetooth peripheral. By using the solution in this application, the terminal device may not only pick up sound through the Bluetooth peripheral, but also perform sound effect processing for different Bluetooth peripherals by using different preset sound effect DRC parameters respectively, to improve the sound effect of the sound picked up through the Bluetooth peripheral, so that a better recording effect can be achieved even if the terminal device is relatively far away from a photographed person or environmental noise surrounding the terminal device is relatively large.

18 Claims, 14 Drawing Sheets

(56) References Cited

U.S. PATENT DOCUMENTS

| | | | | |
|---|---|---|---|---|
| 2013/0226593 | A1* | 8/2013 | Magnusson | H03G 1/02 704/276 |
| 2013/0331034 | A1* | 12/2013 | Tucker | H04M 1/6066 455/41.2 |
| 2018/0199214 | A1 | 7/2018 | Shen | |
| 2019/0380018 | A1 | 12/2019 | Tian | |
| 2020/0037057 | A1 | 1/2020 | Clark et al. | |
| 2021/0044896 | A1* | 2/2021 | Kim | H03F 3/183 |
| 2021/0217433 | A1 | 7/2021 | Liu et al. | |
| 2021/0249030 | A1* | 8/2021 | Lee | G10L 21/0232 |
| 2024/0045645 | A1* | 2/2024 | Hu | G06F 3/165 |

FOREIGN PATENT DOCUMENTS

| | | |
|---|---|---|
| CN | 106792449 A | 5/2017 |
| CN | 107040832 A | 8/2017 |
| CN | 110493751 A | 11/2019 |
| CN | 110662207 A | 1/2020 |
| CN | 111370012 A | 7/2020 |
| CN | 112911566 A | 6/2021 |
| CN | 113794797 A | 12/2021 |
| DE | 102014224883 A1 | 6/2016 |
| EP | 3629561 A1 | 4/2020 |
| KR | 20130046021 A | 5/2013 |
| WO | 2020062900 A1 | 4/2020 |

\* cited by examiner

SOUND PICKUP METHOD FOR TERMINAL DEVICE THROUGH BLUETOOTH PERIPHERAL AND TERMINAL DEVICE

CROSS-REFERENCE TO RELATED APPLICATIONS

This application is a National Stage of International Application No. PCT/CN2022/071055, filed Jan. 10, 2022, which claims priority to Chinese Patent Application No. 202110665714.4, filed Jun. 16, 2021, both of which are hereby incorporated by reference in their entireties.

TECHNICAL FIELD

This application relates to the field of communication technologies, and in particular, to a sound pickup method for a terminal device through a Bluetooth peripheral and a terminal device.

BACKGROUND

Currently, a microphone built in the mobile phone or a headset inserted into the mobile phone is usually used to pick up sound of a photographed person in an audio and video scenario where livestreaming, video capturing, video calling, or the like is performed by the user through an application (application, APP) in the mobile phone. The microphone of the mobile phone has a better sound pickup effect when the photographed person is relatively close to the mobile phone. As the distance between the mobile phone and the photographed person becomes larger, the intensity of the sound of the photographed person picked up through the microphone of the mobile phone becomes smaller, resulting in a poor sound effect of a captured video. Therefore, the sound pickup effect of the microphone of the mobile phone may be affected when the photographed person is relatively far away from the mobile phone or the environmental noise surrounding the mobile phone is excessively large.

SUMMARY

This application provides a sound pickup method for a terminal device through a Bluetooth peripheral and a terminal device, to resolve the problem in the related art that a sound pickup effect of a microphone of the terminal device is relatively poor in some specific scenarios when the terminal device performs audio and video recording or audio and video calling.

To achieve the foregoing objective, the following technical solutions are used in this application:

According to a first aspect, a sound pickup method for a terminal device through a Bluetooth peripheral is provided, including:

instructing, by the terminal device in response to a first operation performed by a user on the terminal device, a target Bluetooth device to record, where the target Bluetooth device is a first Bluetooth device or a second Bluetooth device that has established a Bluetooth connection to the terminal device, and the first operation is used for triggering a first application APP in the terminal device to activate an audio and video service, or triggering recording through the target Bluetooth device in a case that the first APP has activated the audio and video service;

performing, by the terminal device in a case that the terminal device receives a first audio data stream sent by the first Bluetooth device, sound effect processing on the first audio data stream by using a first sound effect dynamic range control DRC parameter, where the first audio data stream corresponds to sound data acquired by a microphone of the first Bluetooth device, and the first sound effect DRC parameter is a preset sound effect processing parameter corresponding to the first Bluetooth device; and performing, by the terminal device in a case that the terminal device receives a second audio data stream sent by the second Bluetooth device, sound effect processing on the second audio data stream by using a second sound effect DRC parameter, where the second audio data stream corresponds to sound data acquired by a microphone of the second Bluetooth device, and the second sound effect DRC parameter is a preset sound effect processing parameter corresponding to the second Bluetooth device, where the first Bluetooth device and the second Bluetooth device have different device types or device models, and the first sound effect DRC parameter is different from the second sound effect DRC parameter.

For Bluetooth peripherals of different types or models, sound effect processing may be performed by using different sound effect DRC parameters, so that a sound effect dynamic range may be adjusted according to specific situations, thereby better improving the sound effect.

According to the sound pickup method for a terminal device through a Bluetooth peripheral provided in this application, in a scenario where the terminal device performs the audio and video service such as livestreaming or video calling, the terminal device may pick up sound data through a microphone of the Bluetooth peripheral, and may perform targeted sound effect processing on the sound data picked up by the Bluetooth peripheral by using a preset sound effect DRC parameter corresponding to the Bluetooth peripheral, thereby improving the sound effect. By using the solution in this application, the terminal device may not only pick up sound through the Bluetooth peripheral, but also perform sound effect processing for different Bluetooth peripherals by using different preset sound effect DRC parameters respectively, to improve the sound effect of the sound picked up through the Bluetooth peripheral, so that a better recording effect can be achieved even if the terminal device is relatively far away from a photographed person or environmental noise surrounding the terminal device is relatively large, thereby improving the user experience.

In a possible implementation, a sound effect parameter library is preset in the terminal device and includes a one-to-one correspondence between Bluetooth device information and a sound effect processing parameter. The sound effect parameter library may include a correspondence between device information of the first Bluetooth device and the first sound effect DRC parameter and a correspondence between device information of the second Bluetooth device and the second sound effect DRC parameter.

Optionally, the foregoing method further includes: determining, by the terminal device according to device information of the target Bluetooth device, a target sound effect DRC parameter corresponding to the target Bluetooth device from the sound effect parameter library, where the device information includes a device name, a Media Access Control (Media Access Control, MAC) address (which is also referred to as a physical address), a manufacturer identifier, and input/output (input/output, I/O) capability information.

In a possible implementation, the sound effect parameter library may include a one-to-one correspondence between a device type of the target Bluetooth device and the target sound effect DRC parameter.

In a possible implementation, the sound effect parameter library may include a one-to-one correspondence between a device model of the target Bluetooth device and the target sound effect DRC parameter.

Optionally, the terminal device may determine a device type or a device model of the target Bluetooth device according to device information of the target Bluetooth device, and then determine a sound effect DRC parameter corresponding to the target Bluetooth device according to the device type or the device model of the target Bluetooth device.

Exemplarily, the determining, by the terminal device according to device information of the target Bluetooth device, a target sound effect DRC parameter corresponding to the target Bluetooth device from the sound effect parameter library includes:

determining, by the terminal device, a device model of the target Bluetooth device according to a device name, a MAC address, and a manufacturer identifier of the target Bluetooth device; and determining, by the terminal device according to the device model of the target Bluetooth device, the target sound effect DRC parameter corresponding to the target Bluetooth device from the sound effect parameter library.

By using the foregoing solution, during sound pickup (such as recording) through the Bluetooth peripheral, for Bluetooth peripherals of different device models, the terminal device may perform sound effect processing on an audio stream obtained by the Bluetooth peripheral by using different preset sound effect DRC parameters, thereby achieving a better recording effect.

In a possible implementation, the determining, by the terminal device according to device information of the target Bluetooth device, a target sound effect DRC parameter corresponding to the target Bluetooth device from the sound effect parameter library includes:

determining, by the terminal device, a device type of the target Bluetooth device according to input/output I/O capability information of the target Bluetooth device; and determining, by the terminal device according to the device type of the target Bluetooth device, the target sound effect DRC parameter corresponding to the target Bluetooth device from the sound effect parameter library, where the device type may include a screen type and a non-screen type.

By using the foregoing solution, during sound pickup (such as recording) through the Bluetooth peripheral, for Bluetooth peripherals of different device types (such as the screen type or the non-screen type), the terminal device may perform sound effect processing on an audio stream obtained by the Bluetooth peripheral by using different preset sound effect DRC parameters, thereby achieving a better recording effect.

In a possible implementation, a Bluetooth device of the non-screen type may include a headset or a speaker having a voice acquisition function, and a Bluetooth device of the screen type may include an in-vehicle terminal or a portable terminal having a display screen and the voice acquisition function. It is to be noted that, descriptions herein are merely exemplary, and this application is not limited thereto. In addition, another possible Bluetooth device may be further included and may be specifically determined according to an actual use condition, and this is not limited in the embodiments of this application.

In a possible implementation, in a case that the target Bluetooth device is a Bluetooth device of the screen type, the determining, by the terminal device, a device type of the target Bluetooth device according to I/O capability information of the target Bluetooth device includes:

determining, by the terminal device, that the target Bluetooth device is of a voice output end type in a case that the target Bluetooth device is used as an output end of an audio data stream in an advanced audio distribution profile A2DP; or determining, by the terminal device, that the target Bluetooth device is of a voice receiving end type in a case that the target Bluetooth device is used as a receiving end of the audio data stream in the A2DP profile.

By using the foregoing solution, during sound pickup (such as recording) through the Bluetooth peripheral, for the Bluetooth peripheral of the screen type, the terminal device may distinguish whether the Bluetooth peripheral is of the voice output end type or the voice receiving end type, and then perform sound effect processing on the audio stream obtained by the Bluetooth peripheral by using a corresponding preset sound effect DRC parameter, thereby achieving a better recording effect.

In a possible implementation, the instructing, by the terminal device in response to a first operation performed by a user on the terminal device, a target Bluetooth device to record includes:

in response to the first operation performed by the user on the terminal device, instructing, by the terminal device in a case that the terminal device determines that the target Bluetooth device meets a preset condition, the target Bluetooth device to record, where the preset condition may be that the target Bluetooth device is in a user wearing state, and/or a distance between the target Bluetooth device and the terminal device is greater than a preset distance threshold. The preset distance threshold may be set according to an actual use requirement. This is not limited in the embodiments of this application.

By using the foregoing solution, when finding that a connection to the Bluetooth device is established, the terminal device may determine whether the Bluetooth peripheral meets the preset condition, for example, the Bluetooth device is in the user wearing state and/or a distance between the Bluetooth device and the terminal device is greater than the preset distance threshold. In a case that the Bluetooth device meets the preset condition (for example, the Bluetooth device is in the user wearing state), the terminal device prompts the user whether it is necessary to pick up voice data (such as record) through a microphone of the Bluetooth device, for the user to select. In this way, user requirements can be better met, thereby improving the user experience.

Optionally, in this embodiment of this application, in a case that the terminal device processes the audio and video service and picks up voice data through the microphone of the Bluetooth device, the terminal device may determine in real time whether the Bluetooth device meets the preset condition. In a case that the Bluetooth device does not meet the preset condition, for example, the Bluetooth device is in a user non-wearing state, the terminal device prompts the user whether it is necessary to switch from picking up voice data through the microphone of the Bluetooth device to picking up voice data through the microphone of the terminal device, for the user to select. In this way, user requirements can be better met, thereby improving the user experience.

In a possible implementation, the instructing, by the terminal device in response to a first operation performed by a user on the terminal device, a target Bluetooth device to record includes:

in response to the first operation, sending, by the terminal device in a case that the target Bluetooth device supports a hands-free profile HFP, a microphone recording instruction to the target Bluetooth device to instruct the target Bluetooth device to record.

By using the foregoing solution, in a case that the Bluetooth peripheral supports the HFP, the Bluetooth peripheral may directly enable a microphone recording function in response to the microphone recording instruction sent by the terminal device, so that the user does not need to manually trigger recording, thereby improving the user experience.

In a possible implementation, the instructing, by the terminal device in response to a first operation performed by a user on the terminal device, a target Bluetooth device to record includes:

prompting, by the terminal device in response to the first operation performed by the user on the terminal device, the user whether to record through a microphone of the target Bluetooth device;

receiving, by the terminal device, a second operation performed by the user, where the second operation is used fir determining to record through the microphone of the target Bluetooth device; and sending, by the terminal device in response to the second operation; the microphone recording instruction to the target Bluetooth device to instruct the target Bluetooth device to record.

By using the solution in this application, when processing the audio and video service, the terminal device may achieve a better sound pickup effect by using the Bluetooth peripheral connected to the terminal device even if the terminal device is relatively far away from the photographed person or the environmental noise surrounding the terminal device is relatively large, thereby improving the user experience.

In a possible implementation, the method further includes:

establishing a synchronous connection oriented SCO link between the terminal device and the target Bluetooth device; and receiving, by the terminal device, a response message sent by the target Bluetooth device, where the response message is used for indicating that the microphone of the target Bluetooth device is turned on.

The terminal device sends a microphone turn-on instruction to the Bluetooth peripheral, that is, the terminal device initiates establishment of the SCO link to the Bluetooth peripheral, to instruct the Bluetooth peripheral to turn on the microphone. Further, after turning on the microphone, the Bluetooth peripheral may send, to the terminal device, the response message for indicating that the microphone of the Bluetooth peripheral is turned on.

The terminal device establishes the SCO link to the Bluetooth peripheral, to directly trigger the Bluetooth peripheral to turn on the microphone. That is, in a case that the SCO link is established between the terminal device and the Bluetooth peripheral, it is considered by default that the Bluetooth peripheral has turned on the microphone. In this case, the Bluetooth peripheral has a function of picking up voice data and transmitting the picked-up voice data to the terminal device in real time.

In a possible implementation, the method further includes:

obtaining, by the terminal device, a first image by capturing through a camera in response to the first operation performed by the user and in a process of obtaining a target audio data stream by recording through the target Bluetooth device; and synthesizing, by the terminal device, the first image and a processed target audio data stream to obtain a first video stream.

By using the solution in this application, when performing the audio and video service such as livestreaming or video calling, the terminal device may achieve a better video recording effect by using the Bluetooth peripheral connected to the terminal device even if the terminal device is relatively far away from the photographed person or the environmental noise surrounding the terminal device is relatively large, thereby improving the user experience.

In a possible implementation, the method further includes:

receiving, by the terminal device, a microphone state query request initiated by the first APP, where the microphone state query request is used for querying whether the microphone is in a turn-on state;

detecting, by the terminal device in response to the microphone state query request, whether the Bluetooth connection between the terminal device and the target Bluetooth device is maintained;

in a case that the Bluetooth connection between the terminal device and the target Bluetooth device is interrupted, detecting, by the terminal device, whether a microphone of the terminal device is turned on, and feeding back a detection result to the first APP; and in a case that the Bluetooth connection and the SCO link between the terminal device and the target Bluetooth device are maintained, feeding back, by the terminal device, to the first APP that the microphone is in the turn-on state.

In this way, when learning that the microphone is in the turn-on state, the first APP may continue to perform audio and video recording or calling. When learning that the microphone is in a turn-off state, the first APP may re-trigger on of the microphone, to ensure that the audio and video service initiated by the first APP can be normally performed, thereby improving the user experience.

In a possible implementation, the method further includes:

receiving, by the terminal device, a microphone turn-off request initiated by the first APP, where the microphone turn-off request is used fur triggering off of the microphone;

detecting, by the terminal device in response to the microphone turn-off request, whether the Bluetooth connection between the terminal device and the target Bluetooth device is maintained;

in a case that the Bluetooth connection between the terminal device and the target Bluetooth device is maintained, interrupting, by the terminal device, the SCO link between the terminal device and the target Bluetooth device to trigger the target Bluetooth device to turn off the microphone; and turning off, by the terminal device, the microphone of the terminal device in a case that the Bluetooth connection between the terminal device and the target Bluetooth device is interrupted and the microphone of the terminal device is in the turn-on state.

In this way, when the audio and video service implemented through the APP ends, a mobile phone may trigger disabling of a voice acquisition function of a microphone according to an actual situation, thereby meeting an actual use requirement of the user and improving the user experience.

In a possible implementation, the method further includes:
routing, by the terminal device, the processed first audio data stream or the processed second audio data stream to a storage path corresponding to the first APP.

By using the solution in this application, when performing the audio and video service through the first APP, the terminal device may not only pick up sound through the Bluetooth peripheral, but also perform sound effect processing for different Bluetooth peripherals by using different preset sound effect DRC parameters respectively, to obtain an audio stream with improved sound quality for further application by the APP.

In a possible implementation, the method further includes:
turning on, by the terminal device in response to the first operation performed by the user, the microphone of the terminal device in a case that the terminal device does not establish the Bluetooth connection to the target Bluetooth device, or has established the Bluetooth connection to the target Bluetooth device but the target Bluetooth device does not support the HFP profile;
acquiring, by the terminal device, sound data through the microphone of the terminal device, to obtain a third audio data stream;
processing, by the terminal device, the third audio data stream to obtain a processed third audio data stream; and
routing, by the terminal device, the processed third audio data stream to the storage path corresponding to the first APP.

In this embodiment of this application, when processing the audio and video service, the terminal device may select to pick up sound through the microphone of the mobile phone or through the microphone of the Bluetooth peripheral according to an actual application scenario, thereby improving the sound pickup effect. In addition, in this embodiment of this application, sound effect processing is performed on the audio stream picked up by the microphone of the Bluetooth peripheral by using a sound effect processing parameter preset for the Bluetooth peripheral of such a type; thereby improving the audio quality.

According to a second aspect, this application provides a sound pickup apparatus for a terminal device through a Bluetooth peripheral, including units configured to perform the method according to the first aspect. The apparatus may correspondingly perform the method described in the first aspect. For relevant description of the units in the apparatus, reference may be made to the description of the first aspect. For brevity, details are not described herein again.

The method according to the first aspect may be implemented by hardware or may be implemented by hardware executing corresponding software. The hardware or the software includes one or more modules or units corresponding to the foregoing functions, for example, a processing module or unit, a display module or unit, and the like.

According to a third aspect, this application provides a terminal device including a processor, where the processor is coupled to a memory, the memory being configured to store a computer program or instructions, and the processor is configured to execute the computer program or instructions stored in the memory, to cause the method according to the first aspect to be performed.

For example, the processor is configured to execute the computer program or instructions stored in the memory, to cause the apparatus to perform the method according to the first aspect.

According to a fourth aspect, this application provides a computer-readable storage medium storing a computer program (which may also be referred to as instructions or code) configured to implement the method according to the first aspect.

For example, the computer program, when executed by a computer, causes the computer to perform the method according to the first aspect.

According to a fifth aspect, this application provides a chip, including a processor. The processor is configured to read and execute a computer program stored in a memory, to perform the method according to the first aspect and any possible implementation of the first aspect.

Optionally, the chip further includes a memory, where the memory is connected to the processor through a circuit or a wire.

According to a sixth aspect, this application provides a system-on-chip, including a processor. The processor is configured to read and execute a computer program stored in a memory, to perform the method according to the first aspect and any possible implementation of the first aspect.

Optionally, the system-on-chip further includes a memory, where the memory is connected to the processor through a circuit or a wire.

According to a seventh aspect, this application provides a computer program product including a computer program (which may also be referred to as instructions or code), the computer program, when executed by a computer, causing the computer to implement the method according to the first aspect.

It may be understood that, for beneficial effects of the second aspect to the seventh aspect, reference may be made to the relevant description in the first aspect, and details are not described herein again.

DESCRIPTION OF EMBODIMENTS

Figure 1:
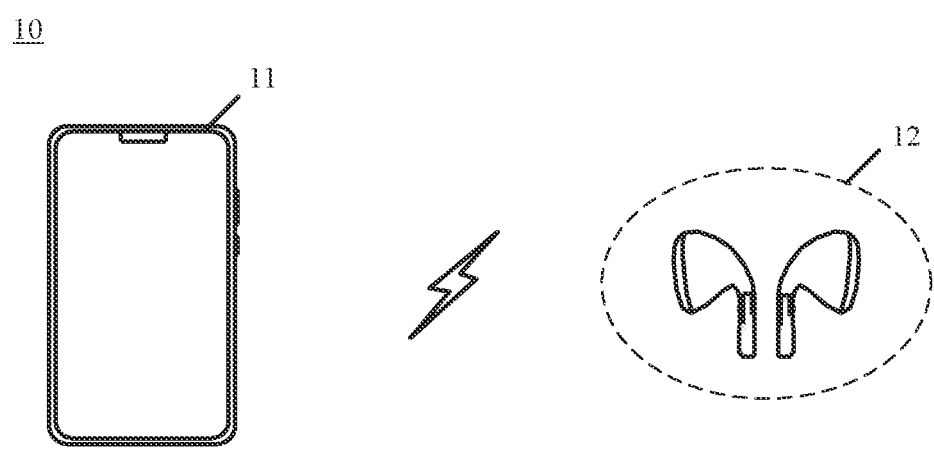
FIG. 1 is a diagram of a system architecture corresponding to a sound pickup method for a terminal device through a Bluetooth peripheral according to an embodiment of this application.

In order to make objectives, technical solutions, and advantages of embodiments of this application clearer, the technical solutions in the embodiments of this application will be clearly and completely described below with reference to the accompanying drawings in the embodiments of this application. Apparently, the embodiments to be described are only a part rather than all of the embodiments of this application. All other embodiments obtained by a person of ordinary skill in the art based on the embodiments of this application without creative efforts shall fall within the protection scope of this application.

The term "and/or" used herein describes only an association relationship for describing associated objects and represents that three relationships may exist. For example, A and/or B may represent the following three cases: Only A exists, both A and B exist, and only B exists. The symbol "/" in this specification represents an "or" relationship between associated objects. For example, "A/B" means A or B.

In the specification and claims in the embodiments of this application, the terms such as "first" and "second" are intended to distinguish between different objects, but do not indicate a particular order of the objects. For example, a first sound effect processing parameter and a second sound effect processing parameter are intended to distinguish between different sound effect processing parameters, but are not intended to indicate a particular order of the sound effect processing parameters.

In the embodiments of this application, the term such as "exemplarily" or "for example" is used to represent giving an example, an illustration, or a description. Any embodiment or design solution described as an "exemplarily" or "for example" in the embodiments of this application should not be explained as being more preferred or having more advantages than another embodiment or design solution. Exactly, the term such as "exemplarily" or "for example" is intended to present a related concept in a specific manner.

In the description of the embodiments of this application, unless otherwise stated, "a plurality of" means two or more. For example, "a plurality of processing units" means two or more processing units. "A plurality of elements" means two or more elements.

For ease of understanding the embodiments of this application, some terms in the embodiments of this application are described below, to facilitate understanding by a person skilled in the art.

(1) SCO: a synchronous connection oriented (synchronous connection oriented, SCO) link, which is also referred to as an SCO link. The SCO link or an extended SCO (extended SCO, eSCO) link is used for transmitting communication data having a very high time requirement, and is mainly used for synchronous voice transfer (for example, an audio and video service). It is to be noted that, in the solution provided in the embodiments of this application, a link is not limited to the SCO link or eSCO link. For ease of description, this solution is exemplarily described below by using the SCO link as an example.

(2) HFP: a hands-free profile (hands-free profile, HFP), which represents a hands-free function. In a case that a Bluetooth device supports the HFP profile and the HFP profile is activated between the Bluetooth device and a terminal device, an audio data stream can be transmitted between the terminal device and a Bluetooth headset based on the HFP profile.

(3) A2DP: an advanced audio distribution profile (advanced audio distribution profile, A2DP), which supports transmission of a stereo audio data stream. The A2DP profile defines a source end (source, which is referred to as src for short) of the audio data stream and a sink end (which is referred to as sink for short) of the audio data stream. A device (for example, a mobile phone) used as the source end and a device (for example, a Bluetooth headset) used as the sink end of the audio data stream may transmit high-quality audio information (that is, the audio data stream) based on the A2DP profile.

(4) DRC: dynamic range control (dynamic range control, DRC) is a sound effect processing manner, where a sound effect processing parameter corresponding to the DRC is referred to as a sound effect DRC parameter, and a dynamic range of a sound level can be adjusted by adjusting a signal amplitude, thereby improving the sound effect. The dynamic range of the sound level refers to a range between a maximum volume and a minimum volume, and can also be measured by a difference between the maximum volume and the minimum volume.

Exemplarily, the following processing may be performed on audio data on a time track: raising, according to a preset sound effect DRC parameter, the volume for audio data whose sound level is less than a preset minimum threshold; and lowering, according to the preset DRC parameter, the volume for audio data whose sound level is greater than a preset maximum threshold, thereby adjusting the dynamic range of the sound level, that is, reducing the dynamic range. From the perspective of an audio processing effect, for a part with a lower sound volume, the volume is raised by performing sound effect processing, and processed sound may be clearer; and for a part with a higher sound volume, the volume is appropriately lowered by performing sound effect processing, and processed sound may be softer. From the perspective of an overall effect, the effect of the processed sound can meet user requirements better, thereby improving the user experience.

FIG. 1 shows a schematic diagram of an architecture of a communication system involved in exemplary embodiments of this application. As shown in FIG. 1, a communication system 10 may include a terminal device 11 and a Bluetooth device 12 (which is a Bluetooth peripheral device, referred to as a Bluetooth peripheral for short), where the terminal device 11 may establish a Bluetooth connection to and communicate with the Bluetooth device 12 through a Bluetooth (Bluetooth, BT) communication protocol. The Bluetooth communication protocol may be a conventional Bluetooth protocol, or may be a Bluetooth low energy (Bluetooth low energy, BLE) protocol. Certainly, the Bluetooth communication protocol may alternatively be another new Bluetooth protocol type launched in the future.

Optionally, the terminal device 11 may be an electronic device such as a smartphone, a tablet computer, a personal digital assistant (personal digital assistant, PDA), a television, or a smart watch. It is to be noted that, in this embodiment of this application, the terminal device 11 includes a camera configured to acquire image data and a microphone configured to acquire sound data, that is, the terminal device 11 has a function of audio and video recording. In this way, an audio and video service such as livestreaming, video calling, video recording, or audio recording may be implemented through the terminal device 11.

Optionally, the Bluetooth device 12 may be an electronic device supporting the Bluetooth communication protocol such as a Bluetooth microphone, a Bluetooth headset, a wireless speaker, a wireless wristband, a wireless in-vehicle device, wireless smart glasses, a wireless watch, an augmented reality (augmented reality, AR)/virtual reality (virtual reality, VR) device, a media player (such as an MP3 or an MP4), a notebook computer, a PDA, a television, or a smart watch. It is to be noted that, in this embodiment of this application, the Bluetooth device 12 includes a microphone having a function of acquiring sound data.

Exemplarily, the description is made by using an example in which the Bluetooth device 12 is a Bluetooth headset. The Bluetooth headset 12 may be of a plurality of types, for example, an ear-bud type, an in-ear type, a head-mounted type, an over-ear type, or an ear-mounted type. Exemplarily, the Bluetooth device 12 may be a true wireless stereo (true wireless stereo, TWS) headset, or may be a neck-band Bluetooth headset.

In some embodiments, the Bluetooth headset 12 may support one or more of the following applications: an HSP (headset profile) application, an HFP application, and an A2DP application. The HSP application is a headset profile application and provides a basic function required by communication between the mobile phone and the Bluetooth headset, where the Bluetooth headset may be used as an audio input and output interface of the mobile phone. The HFP application is a hands-free profile application and some extended functions are added to the HFP application based on the HSP application, where the Bluetooth headset may control an audio and video calling or recording process of the mobile phone, such as answering, hanging up, rejecting, or voice dialing. The A2DP application is an advanced audio distribution profile application, which supports transmission of a stereo audio stream. During actual implementation, in a case that the Bluetooth connection between the Bluetooth headset and the terminal device is maintained, the user may wear the Bluetooth headset to perform an audio service such as listening to music or answering/making a phone call.

Device types of the terminal device 11 and the Bluetooth device 12 are not specifically limited in the embodiments of this application. For ease of description, exemplary descriptions are given below by using an example in which the terminal device 11 is a mobile phone and the Bluetooth device 12 is a Bluetooth headset.

The problems existing in a scenario where the terminal device performs the audio and video service such as livestreaming, video calling, video recording, or audio recording are described below with reference to FIG. 2(a) and FIG. 2(b).

Figure 2A:
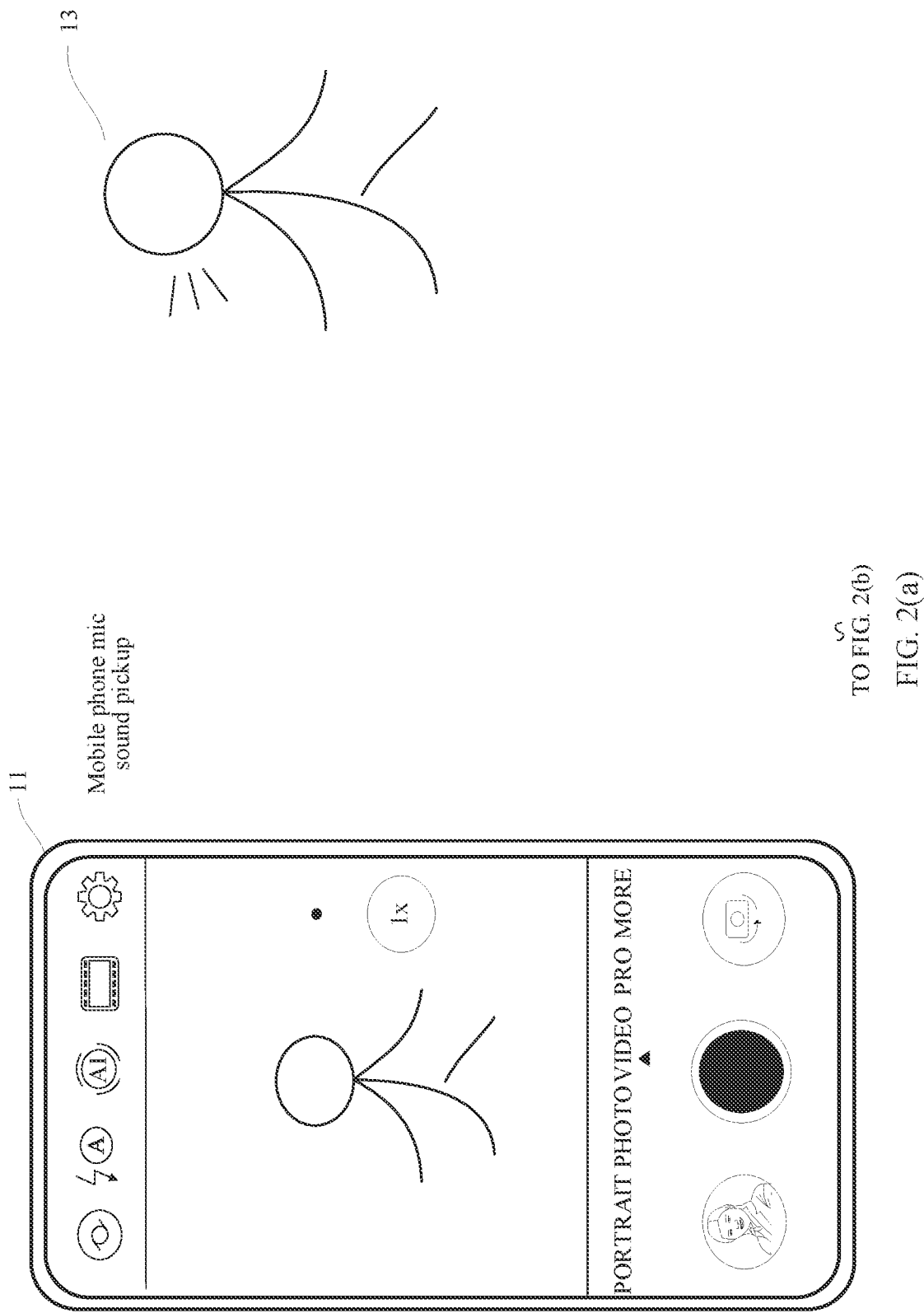
FIG. 2(a) and FIG. 2(b) are a schematic diagram of an application scenario of a sound pickup method for a terminal device through a Bluetooth peripheral according to an embodiment of this application.
Figure 2B:
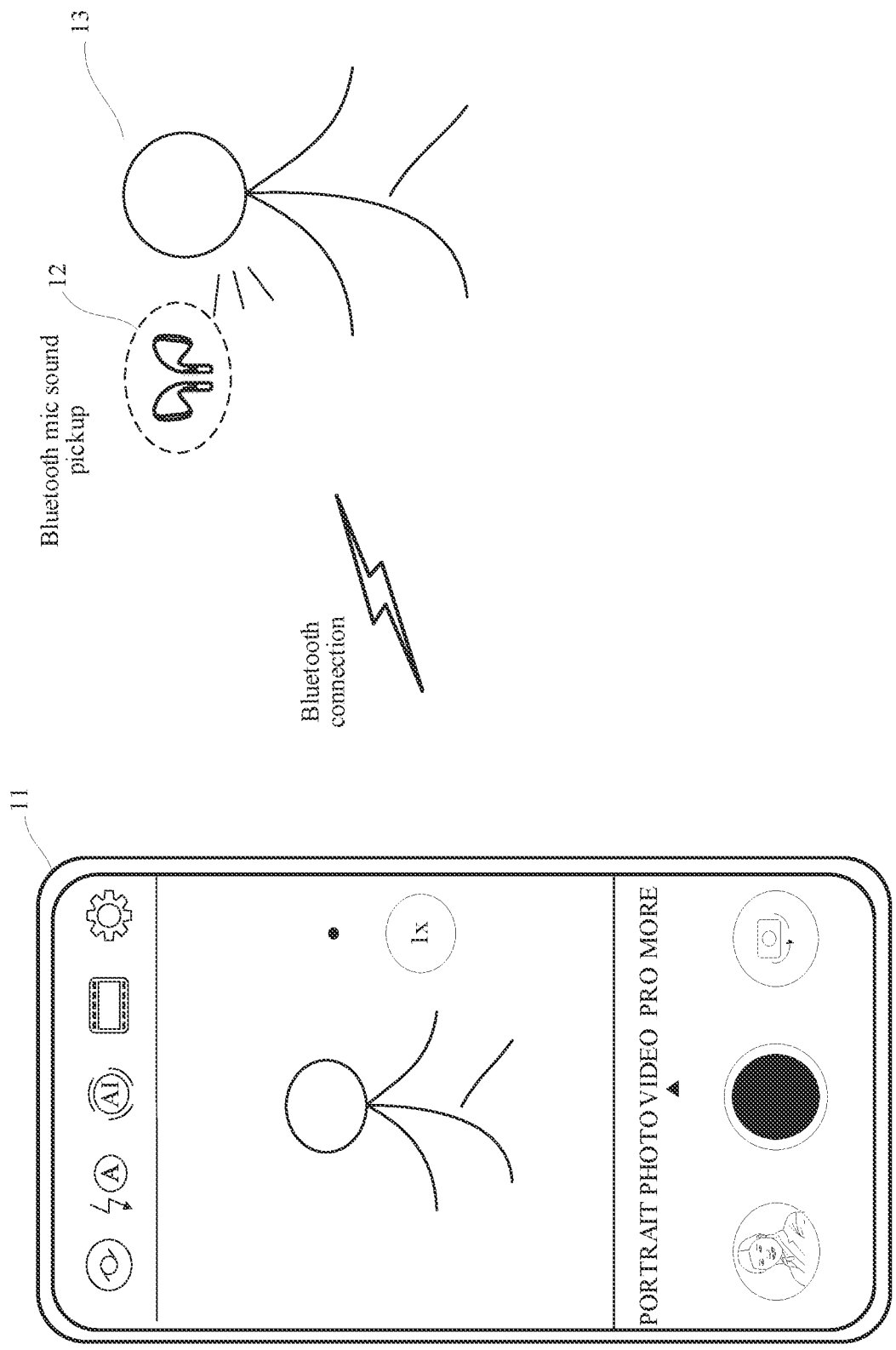

As shown in FIG. 2(a), in a scenario where a user 13 performs the audio and video service such as livestreaming, video calling, video recording, or audio recording through the terminal device 11, sound of the user 13 is usually picked up through a microphone of the terminal device 11 to obtain user audio data, which is referred to as mobile phone mic sound pickup for short in FIG. 2(a) and FIG. 2(b). However, since a distance between the terminal device 11 and the user 13 is greater than a specific distance threshold, or environmental noise surrounding the terminal device 11 and the user 13 is relatively large, the volume of the sound picked up through the microphone of the terminal device 11 may be relatively low, causing a poor sound pickup effect.

This application provides the following solution. As shown in FIG. 2(b), in the scenario where the user 13 performs the audio and video service such as livestreaming, video calling, video recording, or audio recording through the terminal device 11, the sound of the user 13 can be picked up through the microphone of the Bluetooth device 12 in a case that the user 13 wears the Bluetooth device 12 (for example, a Bluetooth headset supporting the HFP profile), and the Bluetooth connection is established between the Bluetooth device 12 and the terminal device 11, which is referred to as Bluetooth mic sound pickup for short in FIG. 2(a) and FIG. 2(b). In this way, the volume of the sound picked up is greatly raised. Further, the Bluetooth device 12 sends the picked-up user audio data to the terminal device 11.

In the scenario where the terminal device performs the audio and video service, the sound can be picked up through the Bluetooth peripheral, thereby raising the volume. However, since voice acquisition functions of microphones configured in a plurality of types of existing Bluetooth peripherals greatly differ, or a Bluetooth channel has a poor quality or is interfered with, the sound effect of the user audio data picked up through the Bluetooth peripheral is poor, and user requirements cannot be met, affecting the user experience.

In view of this, the embodiments of this application provide a sound pickup method for a terminal device through a Bluetooth peripheral and a terminal device, where not only the terminal device can pick up sound through the Bluetooth peripheral, but also the sound effect of the sound picked up through the Bluetooth peripheral can be improved. In the scenario where the terminal device performs the audio and video service such as livestreaming or video calling, the terminal device may pick up sound data through the microphone of the Bluetooth peripheral, and may perform targeted sound effect processing on the sound data picked up by the Bluetooth peripheral by using a preset sound effect DRC parameter corresponding to the Bluetooth peripheral, thereby improving the sound effect. By using the solution in this application, the terminal device may not only pick up sound through the Bluetooth peripheral, but also perform sound effect processing for different Bluetooth peripherals by using different preset sound effect DRC parameters respectively, to improve the sound effect of the sound picked up through the Bluetooth peripheral, so that a better recording effect can be achieved even if the terminal device is relatively far away from a photographed person or environmental noise surrounding the terminal device is relatively large, thereby improving the user experience.

An execution entity of the sound pickup method for a terminal device through a Bluetooth peripheral provided in the embodiments of this application may be the terminal device mentioned above, or may be functional modules and/or functional entities in the terminal device that are capable of implementing the sound pickup method for a terminal device through a Bluetooth peripheral. In addition, the solutions of this application can be implemented in a hardware and/or software manner. Details can be determined according to an actual use requirement, and this is not limited in the embodiments of this application. By using the terminal device as an example, the sound pickup method for a terminal device through a Bluetooth peripheral provided in the embodiments of this application is described exemplarily below with reference to the accompanying drawings.

Figure 3:
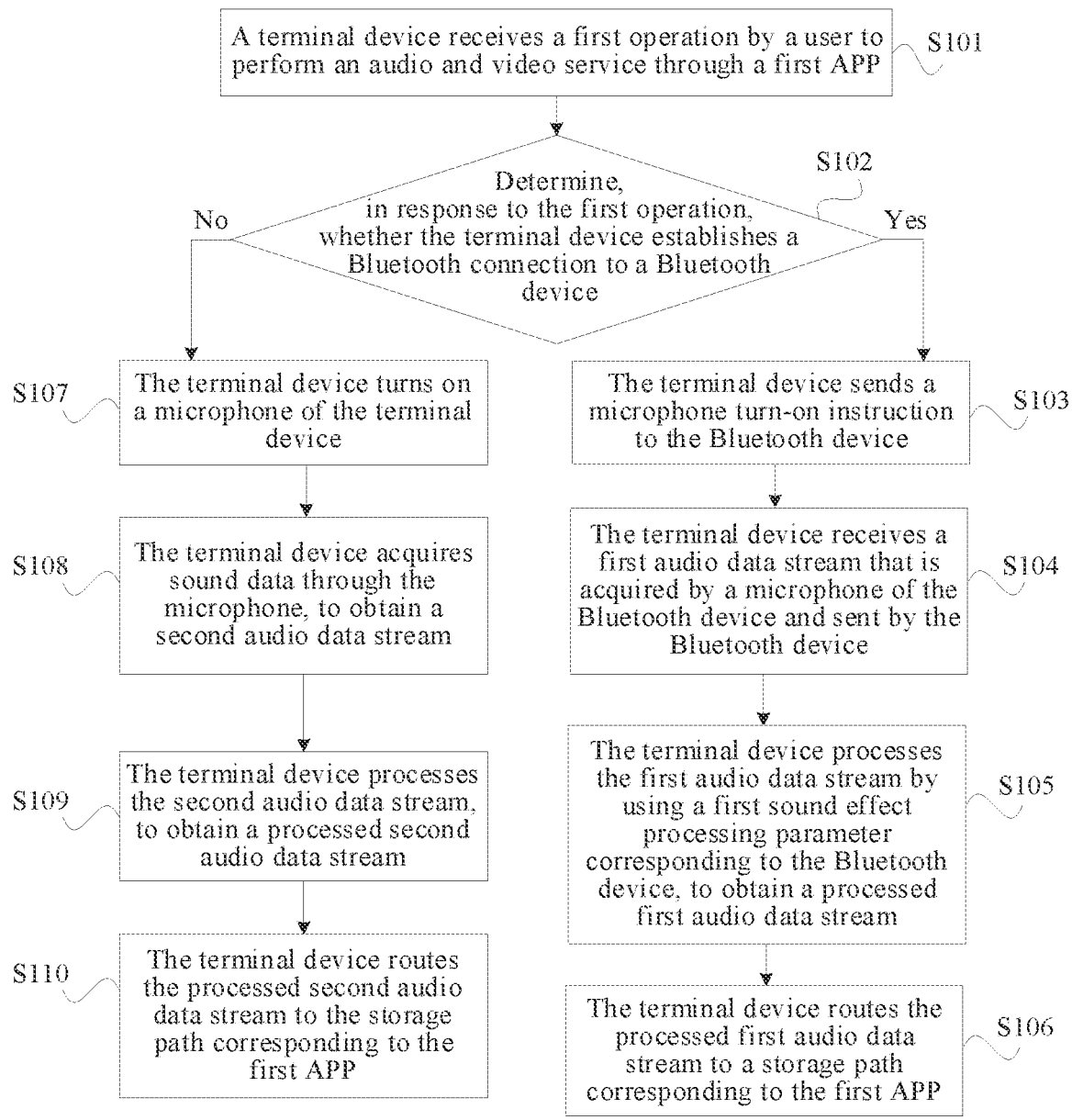
FIG. 3 is a schematic flowchart of a sound pickup method for a terminal device through a Bluetooth peripheral according to an embodiment of this application.

FIG. 3 is a schematic flowchart of a sound pickup method for a terminal device through a Bluetooth peripheral according to an embodiment of this application. As shown in FIG. 3, the method 100 includes the following steps S101 to S110:

S101: A terminal device receives a first operation by a user to perform an audio and video service through a first APP.

S102: The terminal device determines, in response to the first operation, whether a Bluetooth connection is established between the terminal device and a Bluetooth device.

The foregoing audio and video service may include a service involving audio and video recording or calling such as livestreaming, video calling, voice calling, video recording, or audio recording. It may be understood that, descriptions herein are merely exemplary, and the foregoing audio and video service may further include any other possible audio and video service during actual implementation. This is not limited in the embodiments of this application. During processing of the audio and video service by the terminal device, acquisition or pickup of sound data (for example, user voice data) is involved, and the sound data is usually acquired or picked up through a microphone of the terminal device by default. For example, during audio and video recording by the mobile phone, recording is usually implemented through a built-in microphone of the mobile phone or an inserting-type headset by default.

In this embodiment of this application, the foregoing first APP is an application installed or loaded in the terminal device and supporting the audio and video service. The first APP may be a system APP, or may be a third-party APP. This is not limited in the embodiments of this application.

When the user operates the terminal device to trigger activation of the audio and video service of the first APP, the terminal device may detect the first operation performed by the user, and then in response to the first operation, instruct the terminal device to turn on the microphone to pick up the sound data (for example, the user voice data) through the microphone of the terminal device, or instruct the Bluetooth device connected to the terminal device to turn on a microphone to pick up voice data through the microphone of the Bluetooth device. The terminal device may specifically determine, according to a specific situation, whether to pick up voice data through the microphone of the terminal device or to pick up voice data through the microphone of the Bluetooth device. The specific situation may be that the terminal device does not establish a connection to another Bluetooth device, or may be that the Bluetooth connection between the terminal device and a Bluetooth device is maintained.

According to an aspect, in a case that the terminal device has established a Bluetooth connection to the Bluetooth device and the Bluetooth device supports the HFP profile, the terminal device continues to perform the following steps S103 to S106, that is, instructing the Bluetooth device connected to the terminal device to turn on the microphone, to pick up voice data through the microphone of the Bluetooth device.

During actual implementation, as the distance between the mobile phone and the photographed person becomes larger, the intensity of the sound of the photographed person picked up through the microphone of the mobile phone becomes smaller, resulting in a poor sound effect of a captured video. In a case that the mobile phone has established a connection to the Bluetooth peripheral in this case, the microphone of the Bluetooth peripheral may be selected to pick up sound, thereby improving the sound pickup effect.

According to another aspect, in a case that the terminal device has not established a Bluetooth connection to any Bluetooth device, or the terminal device has established a Bluetooth connection to a Bluetooth device but the Bluetooth device does not support the HFP profile, the terminal device continues to perform the following steps S107 to S110, that is, instructing the terminal device to turn on the microphone, to pick up voice data through the microphone of the terminal device.

The first operation may be an operation performed by the user on the terminal device to trigger activation of the audio and video service or transaction, for example, various possible operations triggered by touching or speaking. Details can be determined according to an actual use requirement, and this is not limited in the embodiments of this application.

S103: The terminal device sends a microphone turn-on instruction to the Bluetooth device in a case that the Bluetooth connection is established between the terminal device and the Bluetooth device and the Bluetooth device supports the HFP profile.

In this embodiment of this application, the terminal device sends the microphone turn-on instruction to the Bluetooth device, that is, the terminal device initiates establishment of an SCO link to the Bluetooth device, to instruct the Bluetooth device to turn on the microphone. Further, after turning on the microphone, the Bluetooth device may send, to the terminal device, a response message for indicating that the microphone of the Bluetooth device is turned on.

The terminal device establishes the SCO link to the Bluetooth device, to directly trigger the Bluetooth device to turn on the microphone. That is, in a case that the SCO link is established between the terminal device and the Bluetooth device, it is considered by default that the Bluetooth device has turned on the microphone. In this case, the Bluetooth device has a function of picking up voice data and transmitting the picked-up voice data to the terminal device in real time.

It is to be noted that, the exemplary descriptions are made above by using an example in which once finding that a connection is established to the Bluetooth device, the terminal device directly triggers the microphone of the Bluetooth device to pick up voice data, and the embodiments of this application include the example but are not limited thereto. It may be understood that, during actual implementation, when finding that a connection is established to the Bluetooth device, the terminal device may first prompt the user whether it is necessary to pick up voice data through the microphone of the terminal device or it is necessary to pick up voice data through the microphone of the Bluetooth device, for the user to select. Further, in a case that the user selects to pick up voice data through the microphone of the Bluetooth device, the terminal device may send the microphone turn-on instruction to the Bluetooth device in response to the selection operation performed by the user, to instruct the Bluetooth device to turn on the microphone and pick up voice data.

Optionally, in this embodiment of this application, when finding that a connection to the Bluetooth device is established, the terminal device may determine whether the Bluetooth device meets the preset condition, for example, the Bluetooth device is in the user wearing state, and/or a distance between the Bluetooth device and the terminal device is greater than the preset distance threshold. In a case that the Bluetooth device meets the preset condition (for example, the Bluetooth device is in the user wearing state), the terminal device prompts the user whether it is necessary to pick up voice data through a microphone of the Bluetooth device, for the user to select. In this way, user requirements can be better met, thereby improving the user experience.

Optionally, in this embodiment of this application, in a case that the terminal device processes the audio and video service and picks up voice data through the microphone of the Bluetooth device, the terminal device may determine whether the Bluetooth device meets the preset condition. In a case that the Bluetooth device does not meet the preset condition, for example, the Bluetooth device is in a user non-wearing state, the terminal device prompts the user whether it is necessary to switch from picking up voice data through the microphone of the Bluetooth device to picking up voice data through the microphone of the terminal device, for the user to select. In this way, user requirements can be better met, thereby improving the user experience.

S104: The terminal device receives a first audio data stream that is acquired by a microphone of the Bluetooth device and sent by the Bluetooth device.

During the processing of the audio and video service by the terminal device, after the terminal device establishes the SCO link to the Bluetooth device, the Bluetooth device may pick up surrounding sound data (for example, user voice data), that is, the first audio data stream in real time through the microphone. Further, the Bluetooth device may send the first audio data stream to the terminal device through the SCO link.

S105: The terminal device processes the first audio data stream by using a first sound effect processing parameter corresponding to the Bluetooth device, to obtain a processed first audio data stream.

To be specific to the solutions of this application, as described above, in the scenario where the terminal device performs the audio and video service, although the volume can be raised by picking up sound through the Bluetooth peripheral, the sound effect of voice data picked up by the terminal device through the Bluetooth device cannot meet the user requirements due to various reasons. Therefore, after receiving the first audio data stream sent by the Bluetooth device, the terminal device needs to perform specific sound effect processing on the first audio data stream, to improve the sound effect of the first audio data stream.

In this embodiment of this application, a sound effect parameter library may be preset in the terminal device. The sound effect parameter library may include a one-to-one correspondence between Bluetooth device information and a sound effect processing parameter. The terminal device may invoke, according to the Bluetooth device information, a corresponding sound effect processing parameter from the sound effect parameter library according to an actual use requirement.

It is to be noted that, corresponding sound effect processing parameters may be preset for Bluetooth devices of different types, and a value of a specific sound effect processing parameter may be determined according to laboratory data. In this way, in the solutions of this application, sound effect processing may be performed on the audio stream picked up by the microphone of the Bluetooth peripheral by using a sound effect processing parameter preset for the Bluetooth peripheral of such a type, thereby improving the audio quality.

For example, a sound effect processing parameter preset for the Bluetooth headset may include an equalization processing parameter and a DRC processing parameter. The equalization processing parameter is used for equalization processing for sound signals of frequency bands, to improve the overall sound effect. The DRC processing parameter reduces a dynamic range of a sound level by adjusting a signal amplitude, thereby improving the sound effect.

In another example, a sound effect processing parameter preset for an in-vehicle Bluetooth device may include a noise reduction processing parameter and the DRC processing parameter. The noise reduction processing parameter may be used for decreasing a noise level of the sound signal and increasing a voice level of the sound signal, to increase a signal-to-noise ratio.

It is to be noted that, the foregoing descriptions are exemplary, and during actual implementation, the corresponding sound effect processing parameters may be preset for the Bluetooth devices of different types according to an actual requirement. Details can be determined according to an actual use requirement, and this is not limited in the embodiments of this application.

In some embodiments, the terminal device may first obtain device information of the Bluetooth device, and then determine, according to the device information of the Bluetooth device, the first sound effect processing parameter corresponding to the Bluetooth device from the sound effect parameter library. The device information of the Bluetooth device may include a device name, a physical or MAC address, a manufacturer identifier, and input/output capability information (which is referred to as I/O capability information) of the Bluetooth device, and may certainly further include other device information, for example, microphone performance information. Details can be determined according to an actual use requirement, and this is not limited in the embodiments of this application.

Exemplarily, it is assumed that a correspondence between device information of the Bluetooth headset and the first sound effect processing parameter is stored in the sound effect parameter library, that is, the Bluetooth headset corresponds to the first sound effect processing parameter. In a case that the device information of the Bluetooth headset is known, the terminal device may determine a corresponding first sound effect processing parameter according to the device information of the Bluetooth headset, and further perform sound effect processing on voice data picked up by the Bluetooth headset by using the first sound effect processing parameter.

Optionally, in an embodiment, the sound effect parameter library may include a one-to-one correspondence between a device type of the Bluetooth device and the sound effect processing parameter. In this embodiment of this application, after obtaining the device information of the Bluetooth device, the terminal device may determine the device type of the Bluetooth device according to the I/O capability information of the Bluetooth device. Further, the terminal device may invoke, according to the device type of the Bluetooth device, a corresponding sound effect processing parameter from the sound effect parameter library.

In a case that the Bluetooth device includes a display screen, the Bluetooth device is a Bluetooth device of a screen type. In a case that the Bluetooth device does not include a display screen, the Bluetooth device is a Bluetooth device of a non-screen type.

Exemplarily, in this embodiment of this application, the Bluetooth device of the non-screen type may include a headset or a speaker having a voice acquisition function, and may certainly further include any other possible Bluetooth device, for example, VR glasses. The Bluetooth device of the screen type may include an in-vehicle terminal or a portable terminal having a display screen and the voice acquisition function, and may certainly further include any other possible Bluetooth device, for example, a smart watch. Details can be determined according to an actual use requirement, and this is not limited in the embodiments of this application.

In this embodiment of this application, in a case that the Bluetooth device is a Bluetooth device of the screen type, the determining, by the terminal device, the device type of the Bluetooth device according to the I/O capability information of the Bluetooth device may include: determining, by the terminal device, that the Bluetooth device is a voice output end device of the screen type in a case that the Bluetooth device is used as an output end of an audio data stream in an A2DP profile; or determining, by the terminal device, that the Bluetooth device is a voice receiving end device of the screen type in a case that the Bluetooth device is used as a receiving end of the audio data stream in the A2DP profile.

Exemplarily, the voice output end device of the screen type may be a device including a Bluetooth module (for example, a Bluetooth chip) such as a PC, a PAD, or a mobile phone, and the voice receiving end device of the screen type may be an in-vehicle Bluetooth device and another device including a Bluetooth module (for example, a Bluetooth chip).

Optionally, in another embodiment, the sound effect parameter library may include a one-to-one correspondence between a device model of the Bluetooth device and the sound effect processing parameter. After determining the device type of the Bluetooth device, the terminal device may determine the device model of the Bluetooth device according to the device name, the MAC address, and the manufacturer identifier of the Bluetooth device. Further, the terminal device may determine, according to the device model of the Bluetooth device, the first sound effect processing parameter corresponding to the Bluetooth device from the sound effect parameter library.

In this embodiment of this application, the foregoing first sound effect processing parameter may include a sound effect DRC parameter. Different sound effect DRC parameters may be used for Bluetooth peripherals of different types, so that a sound effect dynamic range may be adjusted according to specific situations, thereby better improving the sound effect.

In a possible implementation, the sound effect parameter library may include a one-to-one correspondence between a device type of a target Bluetooth device and a target sound effect DRC parameter.

In a possible implementation, the sound effect parameter library may include a one-to-one correspondence between a device model of the target Bluetooth device and the target sound effect DRC parameter.

Optionally, the terminal device may determine a device type or a device model of the target Bluetooth device according to device information of the target Bluetooth device, and then determine a sound effect DRC parameter corresponding to the target Bluetooth device according to the device type or the device model of the target Bluetooth device.

Exemplarily, assuming that a device model of a Bluetooth device 1 is xyz, a device model of a Bluetooth device 2 is abc, and the sound effect parameter library stores a correspondence between the device model xyz and a sound effect DRC parameter 0.6 and a correspondence between the device model abc and a sound effect DRC parameter 0.5, the terminal device may determine, according to the device model xyz of the Bluetooth device 1, the sound effect DRC parameter 0.6 corresponding to the device model xyz of the Bluetooth device 1; and the terminal device may further determine, according to the device model abc of the Bluetooth device 2, the sound effect DRC parameter 0.5 corresponding to the device model abc of the Bluetooth device 2.

Further, when receiving an audio data stream 1 sent by the Bluetooth device 1, the terminal device may perform sound effect processing on the audio data stream 1 by using the sound effect DRC parameter 0.6; or when receiving an audio data stream 2 sent by the Bluetooth device 2, the terminal device may perform sound effect processing on the audio data stream 2 by using the sound effect DRC parameter 0.5.

In this way, sound effect processing is performed for different Bluetooth peripherals by using different preset sound effect DRC parameters respectively, to improve the sound effect of the sound picked up through the Bluetooth peripheral, so that a better recording effect can be achieved even if the terminal device is relatively far away from a photographed person or environmental noise surrounding the terminal device is relatively large.

S106: The terminal device routes the processed first audio data stream to a storage path corresponding to the first APP.

In this embodiment of this application, after processing the first audio data stream by using the first sound effect processing parameter corresponding to the Bluetooth device, the terminal device may route, through an audio framework interface of the terminal device, the processed first audio data stream to the storage path corresponding to the first APP for storage, so that the first APP can invoke the processed first audio data stream in the storage path.

In this embodiment of this application, in response to the first operation performed by the user to record a video through the first APP the terminal device obtains a first image by capturing through a camera in a process of acquiring the first audio data stream through the Bluetooth device by the terminal device. The terminal device may synthesize the first image and the processed first audio data stream, to obtain a first video stream.

By using the solution in this application, when processing the audio and video service, the terminal device may achieve a better sound pickup effect by using the Bluetooth peripheral connected to the terminal device even if the terminal device is relatively far away from the photographed person or the environmental noise surrounding the terminal device is relatively large, thereby improving the user experience.

S107: The terminal device turns on a microphone of the terminal device in a case that the terminal device does not establish the Bluetooth connection to the Bluetooth device, or the Bluetooth connection is established between the terminal device and the Bluetooth device but the Bluetooth device does not support the HFP profile.

S108: The terminal device acquires sound data through the microphone of the terminal device, to obtain a second audio data stream.

The terminal device turns on the microphone of the terminal device according to the microphone turn-on instruction, and picks up sound data, for example, user voice data, surrounding the terminal device in real time through the microphone of the terminal device.

S109: The terminal device processes the second audio data stream, to obtain a processed second audio data stream.

In this embodiment of this application, the terminal device may process the second audio data stream by using a second sound effect processing parameter corresponding to the terminal device, to obtain the processed second audio data stream. The second sound effect processing parameter herein is different from the foregoing first sound effect processing parameter.

S110: The terminal device routes the processed second audio data stream to the storage path corresponding to the first APP.

In this embodiment of this application, in a case that the terminal device acquires sound data through the microphone of the terminal device, the terminal device may route, through the audio framework interface of the terminal device, the locally processed second audio data stream to the storage path corresponding to the first APP for storage, so that the first APP can invoke the processed first audio data stream in the storage path.

Optionally, in this embodiment of this application, to ensure that the audio and video service initiated by the first APP can be normally performed, the first APP may send, to the terminal device, a microphone state query request for querying whether the microphone is in a turn-on state. After receiving the microphone state query request initiated by the first APP, the terminal device may detect, in response to the microphone state query request, whether the Bluetooth connection between the terminal device and the Bluetooth device is maintained, and then feed back to the first APP whether the microphone is in a turn-on state or a turn-off state according to an actual situation.

According to an aspect, in a case that the Bluetooth connection between the terminal device and the Bluetooth device is interrupted, the terminal device detects whether the microphone of the terminal device is turned on, and feeds back a detection result to the first APP. Specifically, when detecting that the microphone of the terminal device is in the turn-on state, the terminal device feeds back to the first APP that the microphone is in the turn-on state, and when detecting that the microphone of the terminal device is in the turn-off stale, the terminal device feeds back to the first APP that the microphone is in the turn-off state.

According to another aspect, in a case that the Bluetooth connection and the SCO link between the terminal device and the Bluetooth device are maintained, the terminal device feeds back to the first APP that the microphone is in the turn-on state.

In this way, when learning that the microphone is in the turn-on state, the first APP may continue to perform audio and video recording or calling. When learning that the microphone is in the turn-off state, the first APP may re-trigger on of the microphone, to ensure that the audio and video service initiated by the first APP can be normally performed.

Optionally, in this embodiment of this application, when the user triggers stop of the audio and video service implemented through the first APP, the terminal device may receive a microphone turn-off request initiated by the first APP and used for triggering off of the microphone. Further, the terminal device may detect, in response to the microphone turn-off request, whether the Bluetooth connection between the terminal device and the Bluetooth device is maintained, and then turn off the microphone of the terminal device or the microphone of the Bluetooth device according to an actual situation.

According to an aspect, in a case that the Bluetooth connection between the terminal device and the Bluetooth device is maintained, the terminal device interrupts the SCO link between the terminal device and the Bluetooth device to trigger the Bluetooth device to turn off the microphone.

According to another aspect, the terminal device turns off the microphone of the terminal device in a case that the Bluetooth connection between the terminal device and the Bluetooth device is interrupted and the microphone of the terminal device is in the turn-on state.

In this way, when the audio and video service implemented through the first APP ends, the terminal device may trigger disabling of a voice acquisition function of the microphone according to an actual situation, thereby meeting an actual use requirement of the user and improving the user experience.

Referring to FIG. 4 to FIG. 7A and FIG. 7B, a specific implementation of the sound pickup method for a terminal device through a Bluetooth peripheral provided in the embodiments of this application is exemplarily described below by using an example in which the terminal device is a mobile phone.

Figure 4:
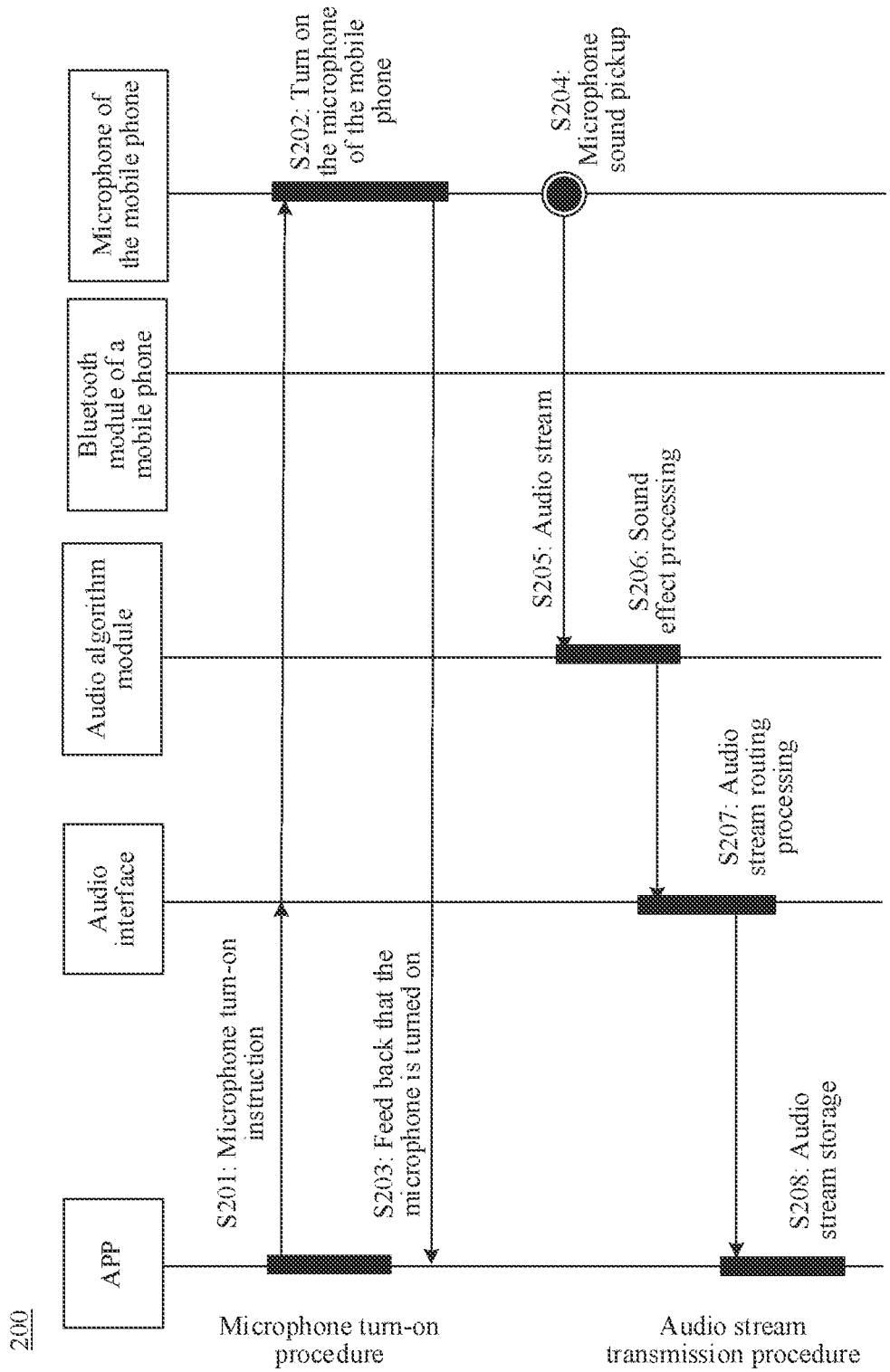
FIG. 4 is a schematic flowchart of a sound pickup method for a terminal device through a Bluetooth peripheral.

FIG. 4 shows an implementation process of processing an audio and video service by a mobile phone in the related art. As shown in FIG. 4, the implementation process 200 includes the following steps S201 to S208.

S201: An APP in the mobile phone initiates a microphone turn-on instruction of the mobile phone in a case that a user initiates an audio and video service through the APP.

S202: The mobile phone calls an audio interface to trigger on of a microphone of the mobile phone.

After being turned on, the microphone of the mobile phone may pick up sound surrounding the mobile phone in real time (which is briefly referred to as microphone sound pickup).

S203: After being turned on, the microphone of the mobile phone feeds back to the APP that the microphone is turned on.

The foregoing steps S201 to S203 are microphone turn-on procedures.

S204: The mobile phone picks up sound (for example, picking up user voice data) through the microphone, to obtain an audio data stream (which is briefly referred to as an audio stream below).

S205: The mobile phone transmits the audio stream to an audio algorithm module of the mobile phone.

The audio algorithm module is also referred to as an audio processing module, and is configured to perform sound effect processing on the audio stream.

S206: The audio algorithm module of the mobile phone performs sound effect processing on the audio stream.

S207: The mobile phone calls the audio interface to route a processed audio stream to the APP.

S208: The APP stores the processed audio stream.

The foregoing steps S204 to S208 are audio stream transmission procedures.

Figure 5A:
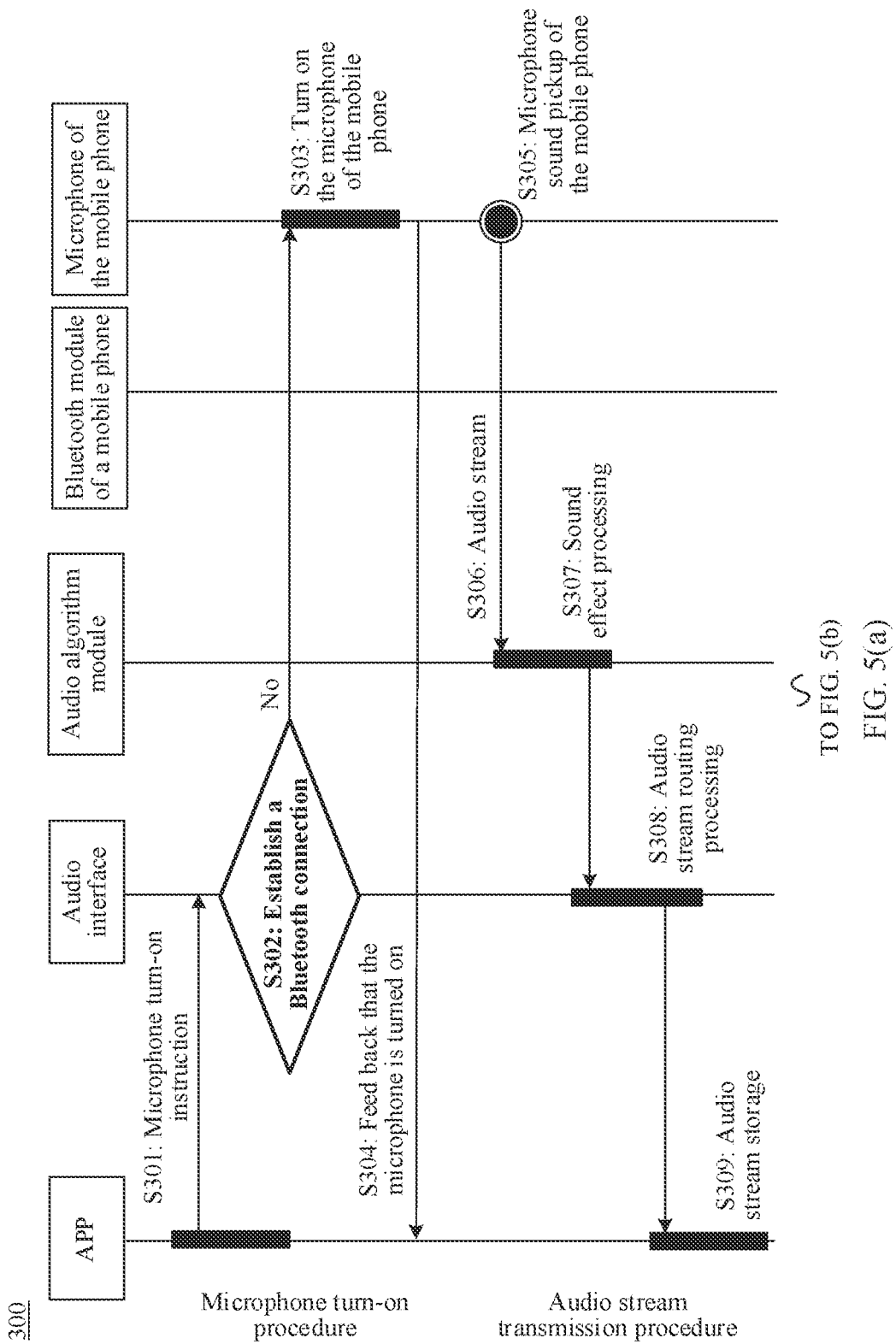
FIG. 5(a) and FIG. 5(b) are a first schematic flowchart of a sound pickup method for a terminal device through a Bluetooth peripheral according to an embodiment of this application.
Figure 5B:
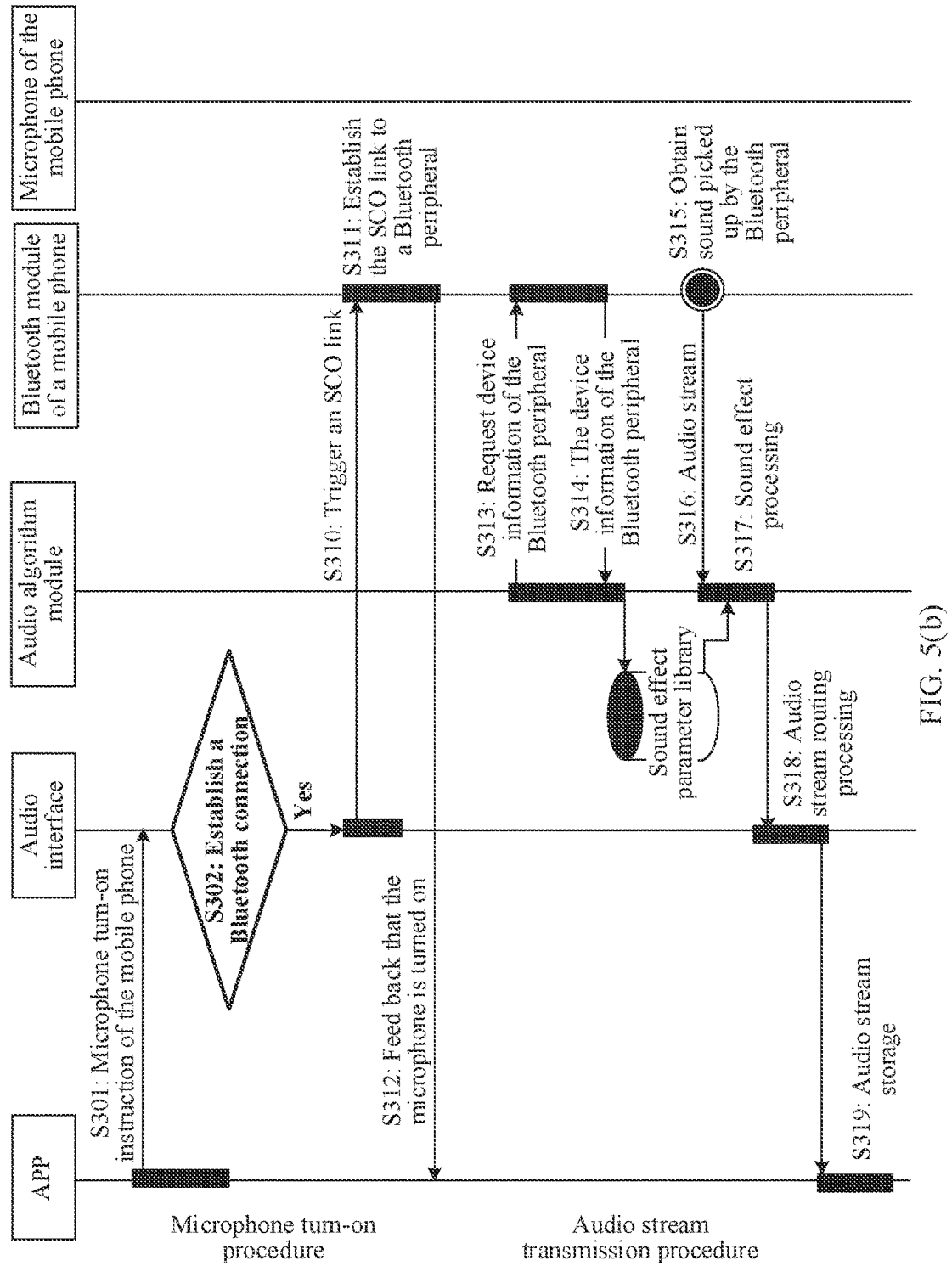

FIG. 5(a) and FIG. 5(b) show a schematic flowchart of a sound pickup method for a terminal device through a Bluetooth peripheral according to an embodiment of this application. As shown in FIG. 5(a) and FIG. 5(b), the method 300 includes the following steps S301 to S319.

S301: An APP in a mobile phone initiates a microphone turn-on instruction in a case that a user initiates an audio and video service through the APP.

S302: The mobile phone calls, in response to the microphone turn-on instruction, an audio interface to determine whether the mobile phone establishes a Bluetooth connection to a Bluetooth peripheral.

The mobile phone calls the audio interface to determine whether the Bluetooth connection is established between the mobile phone and the Bluetooth peripheral, and routes the microphone turn-on instruction according to a determination result.

If it is determined that the mobile phone does not establish the Bluetooth connection to another Bluetooth peripheral (which corresponds to "No" shown in FIG. 5(a)), steps S303 to S309 are performed, that is, calling the audio interface in the mobile phone to trigger on of the microphone of the mobile phone and pick up sound through the microphone of the mobile phone.

If it is determined that the mobile phone establishes the Bluetooth connection to a Bluetooth device (which corresponds to "Yes" shown in FIG. 5(b)), steps S310 to S319 are performed, that is, calling the audio interface in the mobile phone to send the microphone turn-on instruction to the Bluetooth peripheral through a Bluetooth module of the mobile phone, to trigger the mobile phone to establish an SCO link to the Bluetooth peripheral and pick up sound through a microphone of the Bluetooth peripheral.

S303: In a case that the mobile phone is not connected to the Bluetooth peripheral, the mobile phone calls the audio interface to trigger on of the microphone of the mobile phone.

S304: After being turned on, the microphone of the mobile phone feeds back to the APP that the microphone is turned on.

S305: The mobile phone picks up sound through the microphone to obtain an audio stream.

S306: The mobile phone transmits the audio stream to an audio algorithm module of the mobile phone.

The audio algorithm module is also referred to as an audio processing module, and is configured to perform sound effect processing on the audio stream.

S307: The mobile phone performs sound effect processing on the audio stream through the audio algorithm module.

S308: The mobile phone calls the audio interface to route a processed audio stream to the APP.

S309: The APP stores the processed audio stream.

The foregoing steps S301 to S304 are microphone turn-on procedures of the mobile phone, and the foregoing steps S305 to S309 are microphone sound pickup and audio stream transmission procedures of the mobile phone. A specific implementation process of steps S305 to S309 shown in FIG. 5(a) is similar to an implementation process of steps S204 to S208 shown in FIG. 4, and is not described herein again.

The microphone turn-on procedures of the mobile phone, and the microphone sound pickup and audio stream transmission procedures of the mobile phone are described above with reference to FIG. 5(a), and microphone turn-on procedures of the Bluetooth peripheral, and microphone sound pickup and audio stream transmission procedures of the Bluetooth peripheral are described below with reference to FIG. 5(b).

S310: In a case that the mobile phone is connected to a Bluetooth peripheral and the Bluetooth peripheral supports the HFP profile, the mobile phone calls the audio interface to trigger the Bluetooth module of the mobile phone to establish an SCO link to the Bluetooth peripheral.

S311: The Bluetooth module of the mobile phone establishes the SCO link to the Bluetooth peripheral, so that an audio stream picked up by the microphone of the Bluetooth peripheral can be synchronously transmitted to the Bluetooth module of the mobile phone.

S312: After establishing the SCO link to the Bluetooth peripheral, the Bluetooth module of the mobile phone feeds back to the APP that the microphone is turned on.

S313: The audio algorithm module requests device information of the Bluetooth peripheral from the Bluetooth module of the mobile phone.

It is to be noted that, the step of S313 may be performed after the Bluetooth module of the mobile phone establishes the SCO link to the Bluetooth peripheral, or may be performed in a case that the Bluetooth module of the mobile phone receives the audio stream sent by the Bluetooth peripheral. Details can be determined according to an actual use requirement, and this is not limited in the embodiments of this application.

S314: The Bluetooth module of the mobile phone feeds back the device information of the Bluetooth peripheral to the audio algorithm module, and then the audio algorithm module may determine, according to the device information of the Bluetooth peripheral, a sound effect processing parameter corresponding to the Bluetooth peripheral from a preset sound effect parameter library.

S315: The Bluetooth module of the mobile phone receives sound data, that is, the audio stream, picked up by the microphone of the Bluetooth peripheral and sent by the Bluetooth peripheral.

S316: The Bluetooth module of the mobile phone transmits the audio stream to the audio algorithm module.

S317: The audio algorithm module performs sound effect processing on the audio stream picked up by the Bluetooth peripheral by using the sound effect processing parameter corresponding to the Bluetooth peripheral that is determined in S314.

Audio streams picked up by Bluetooth peripherals of different types are processed by using sound effect processing parameters (for example, sound effect DRC parameters) corresponding to the types of the Bluetooth peripherals, so that the audio effect can be improved to some extent.

S318: The mobile phone calls the audio interface to route a processed audio stream to the APP.

S319: The APP stores the processed audio stream.

The foregoing steps S301 and S302 and S310 to S312 are microphone turn-on procedures of the Bluetooth peripheral, and steps S313 to S319 are microphone sound pickup and audio stream transmission procedures of the mobile phone.

Referring to FIG. 5(a) and FIG. 5(b), it can be seen that, when a third-party APP (for example, a short video application or platform) calls the audio interface to turn on the microphone of the mobile phone to perform sound pickup (for example, sound recording), the mobile phone first determines whether the mobile phone is currently connected to a Bluetooth peripheral supporting the HFP profile. If no, the mobile phone continues to perform original procedures to turn on the microphone of the mobile phone to perform sound pickup through the microphone of the mobile phone. If yes, the mobile phone calls the Bluetooth module to establish an SCO link to the Bluetooth peripheral and trigger sound pickup through the microphone of the Bluetooth peripheral.

Compared with the implementation process of picking up sound through the microphone of the mobile phone when the mobile phone processes the audio and video service in the related art shown in FIG. 4, in an embodiment of this application shown in FIG. 5(a) and FIG. 5(b), when processing the audio and video service, the mobile phone may select to pick up sound through the microphone of the mobile phone or through the microphone of the Bluetooth peripheral according to an actual application scenario, thereby improving the sound pickup effect. In addition, in this embodiment of this application, sound effect processing is performed on the audio stream picked up by the microphone of the Bluetooth peripheral by using a sound effect processing parameter preset for the Bluetooth peripheral of such a type, thereby improving the audio quality.

In this embodiment of this application, in a case that the Bluetooth peripheral is connected to the mobile phone, if the third-party APP initiates a recording request, the mobile phone may change the request from the APP for using the microphone of the mobile phone, and route an audio channel as the Bluetooth peripheral, so that the mobile phone may pick up sound through the Bluetooth peripheral. In addition, a more accurate device classification manner may be used in the solutions of this application, and different sound effect DRC parameters are used for Bluetooth peripherals of different types, to perform sound effect processing on the audio stream picked up by the Bluetooth peripheral, thereby improving the effect of picking up sound through the Bluetooth peripheral.

Optionally, in this embodiment of this application, to ensure that the audio and video service initiated through the APP can be normally performed, after triggering on of the microphone, some APPS may send a microphone state query instruction to the mobile phone to query whether the microphone is in a turn-on state. It is to be noted that, since an improvement, that is, audio routing switch is made to the solutions of this application, the query for a state of the microphone of the mobile phone needs to be switched to the query for a state of the Bluetooth microphone.

Figure 6A:
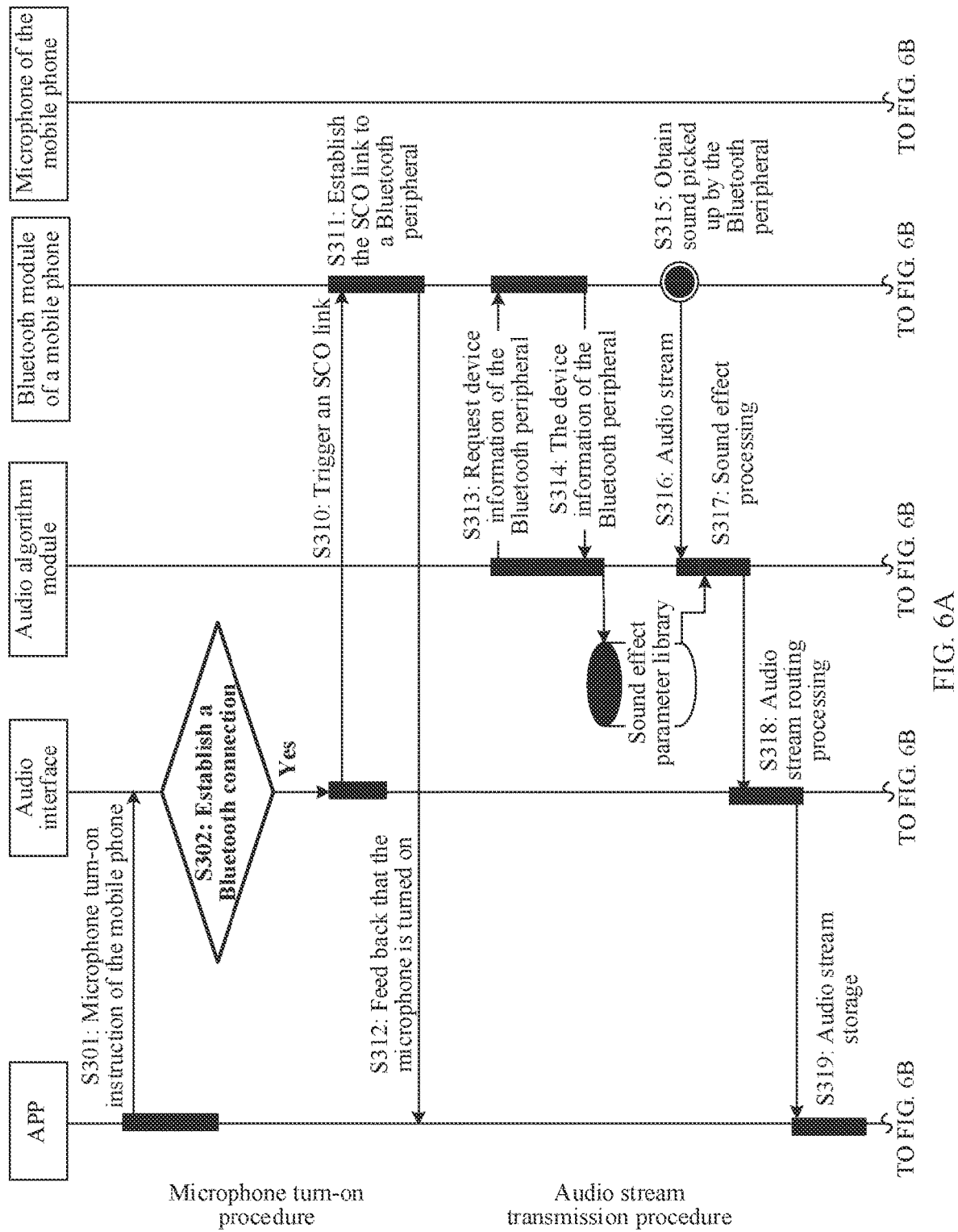
FIG. 6A and FIG. 6B are a second schematic flowchart of a sound pickup method for a terminal device through a Bluetooth peripheral according to an embodiment of this application.
Figure 6B:
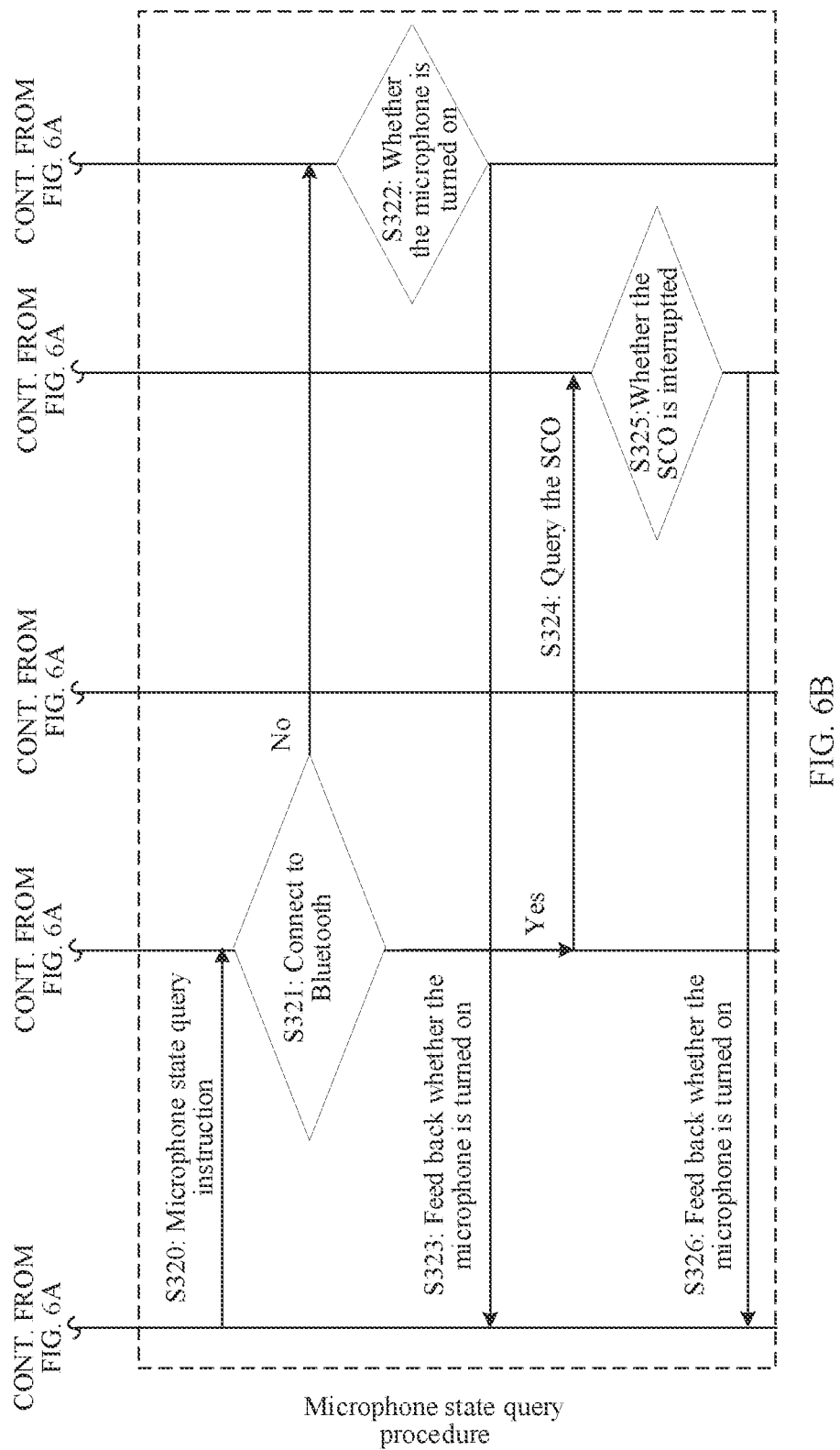

Procedures of querying a state of a microphone in the sound pickup method for a terminal device through a Bluetooth peripheral provided in the embodiments of this application are exemplarily described below with reference to FIG. 6A and FIG. 6B. Referring to FIG. 5(a) and FIG. 5(b), the method 300 further includes the following steps S320 to S326, as shown in FIG. 6A and FIG. 6B.

S320: The APP initiates a microphone state query instruction.

The microphone state query instruction may be periodically initiated by the APP, or may be initiated by the APP in response to a user operation.

S321: The mobile phone calls the audio interface to determine whether the mobile phone has a Bluetooth connection.

If not, the following steps S322 to S323 are performed; or if yes, the following steps S324 to S326 are performed.

S322: In a case that the mobile phone has no Bluetooth connection, the mobile phone detects whether the microphone is in a turn-on state.

S323: The mobile phone feeds back to the APP whether the microphone is in the turn-on state.

S324: Instruct, in a case that the mobile phone maintains a Bluetooth connection to a Bluetooth peripheral, the Bluetooth module of the mobile phone to query a condition of an SCO link.

S325: The Bluetooth module of the mobile phone queries whether the SCO link between the mobile phone and the Bluetooth peripheral is interrupted.

S326: The Bluetooth module of the mobile phone feeds back to the APP whether the microphone is in the turn-on state.

In a case that the SCO link between the mobile phone and the Bluetooth peripheral is not interrupted, the Bluetooth module of the mobile phone feeds back to the APP that the microphone is in the turn-on state. In a case that the SCO link between the mobile phone and the Bluetooth peripheral is interrupted, the Bluetooth module of the mobile phone feeds back to the APP that the microphone is turned off.

In this embodiment of this application, after receiving the microphone state query request initiated by the APP the mobile phone may detect, in response to the microphone state query request, whether the Bluetooth connection between the mobile phone and the Bluetooth peripheral is maintained, and then feed back to the APP whether the microphone is in the turn-on state or the turn-off state according to an actual situation. According to an aspect, in a case that the Bluetooth connection between the mobile phone and the Bluetooth peripheral is interrupted, the mobile phone detects whether the microphone is turned on and feeds back a detection result to the APP. According to another aspect, in a case that the Bluetooth connection and the SCO link between the mobile phone and the Bluetooth device are maintained, the mobile phone feeds back to the APP that the microphone is in the turn-on state. In this way, when learning that the microphone is in the turn-on state, the APP may continue to perform audio and video recording or calling. When learning that the microphone is in the turn-off state, the APP may re-trigger on of the microphone, to ensure that the audio and video service initiated by the APP can be normally performed.

Optionally, in this embodiment of this application, to ensure that the audio and video service initiated through the APP can normally end, the APP may send, to the mobile phone, a microphone turn-off instruction for instructing to turn off the microphone. It is to be noted that, since an improvement, that is, audio routing switch is made to the embodiments of this application based on the existing technical solutions, an action of turning off the microphone of the mobile phone needs to be switched to an action of interrupting the Bluetooth SCO link.

Figure 7A:
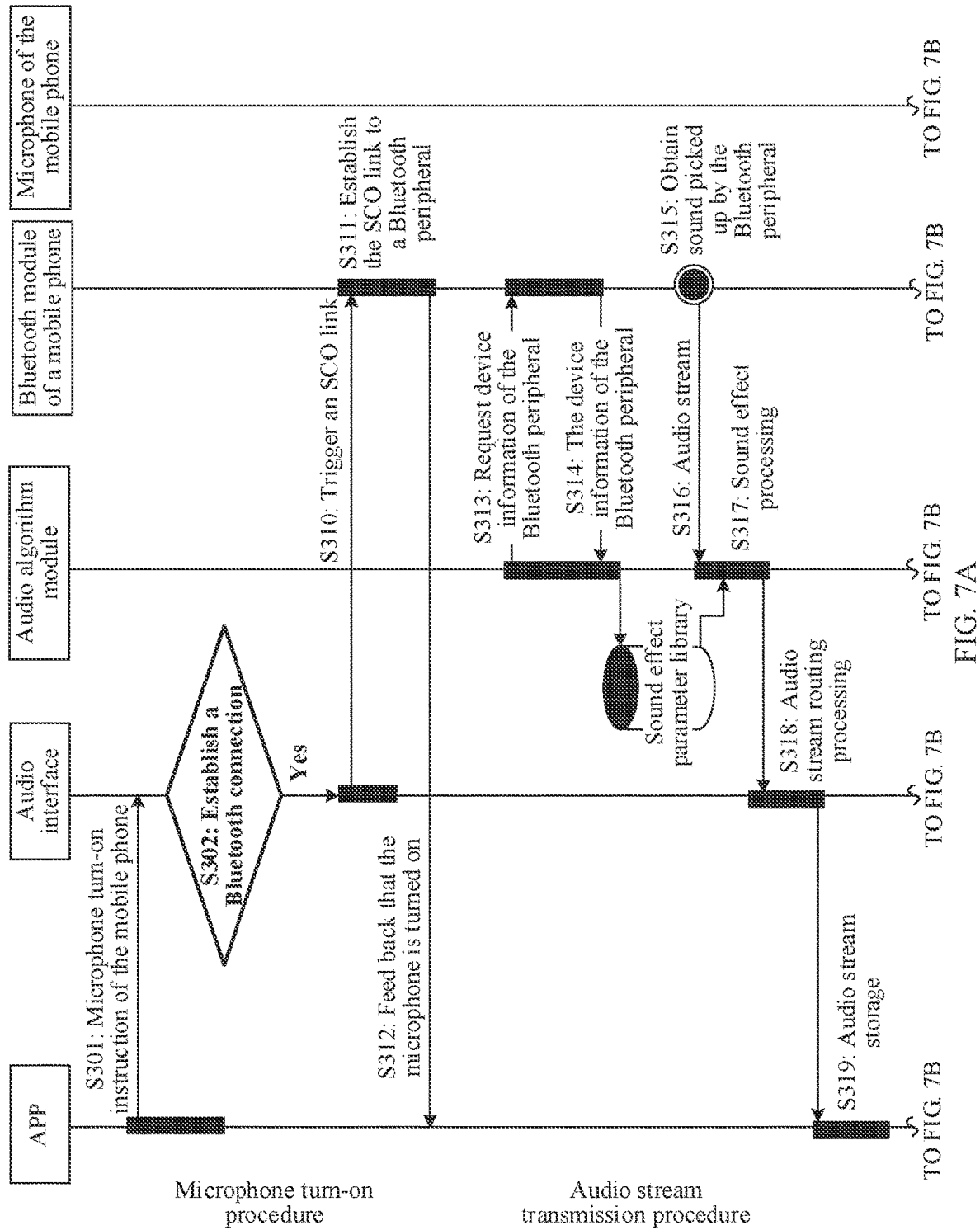
FIG. 7A and FIG. 7B are a third schematic flowchart of a sound pickup method for a terminal device through a Bluetooth peripheral according to an embodiment of this application.
Figure 7B:
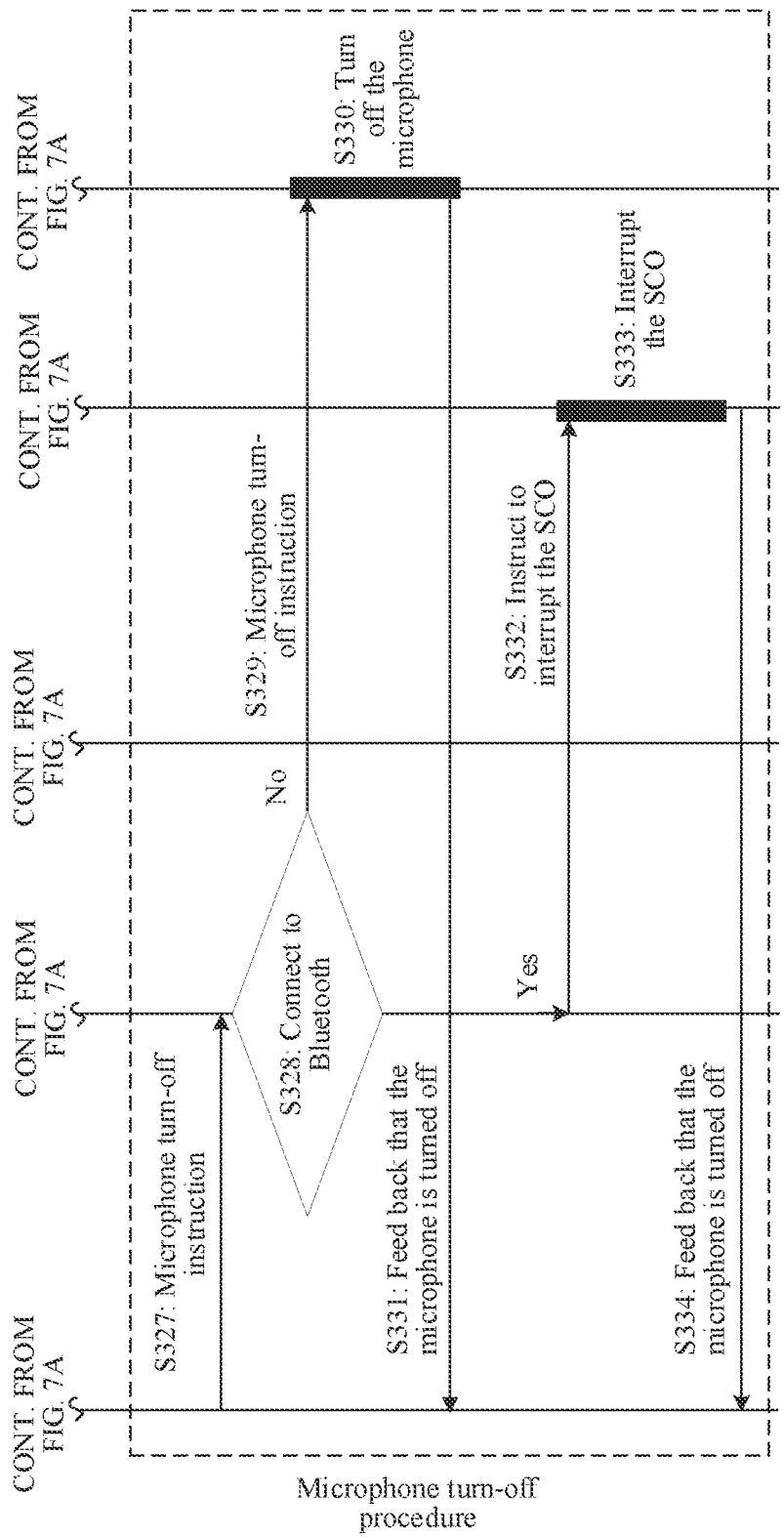

Procedures of turning off the microphone in the sound pickup method for a terminal device through a Bluetooth peripheral provided in the embodiments of this application are exemplarily described below with reference to FIG. 7A and FIG. 7B. Referring to FIG. 5(a) and FIG. 5(b), the method 300 further includes the following steps S327 to S334, as shown in FIG. 7A and FIG. 7B.

S327: The APP initiates a microphone turn-off instruction.

The microphone turn-off instruction may be initiated by the APP in response to a trigger operation performed by the user.

S328: The mobile phone calls the audio interface to determine whether the mobile phone has a Bluetooth connection.

If not, the following steps S329 to S330 are performed; or if yes, the following steps S331 to S332 are performed.

S329: In a case that the mobile phone has no Bluetooth connection, the mobile phone calls an audio module to transmit the microphone turn-off instruction to the microphone of the mobile phone.

S330: Turn the microphone of the mobile phone off in response to the microphone turn-off instruction.

S331: The microphone of the mobile phone feeds back to the APP that the microphone is turned off.

Based on S329 to S331, it can be seen that, the microphone of the mobile phone is turned off in a case that the Bluetooth connection between the mobile phone and the Bluetooth peripheral is interrupted and the microphone of the mobile phone is in the turn-on state.

S332: In a case that the mobile phone maintains a Bluetooth connection to a Bluetooth peripheral, the mobile phone calls the audio module to transmit the microphone turn-off instruction to the Bluetooth module of the mobile phone, to instruct the Bluetooth module of the mobile phone to interrupt the SCO link to the Bluetooth peripheral.

S333: The Bluetooth module of the mobile phone interrupts the SCO link between the mobile phone and the Bluetooth peripheral in response to the microphone turn-off instruction.

S334: The Bluetooth module of the mobile phone feeds back to the APP that the microphone is turned off.

Based on S332 to S334, it can be seen that, in a case that the Bluetooth connection between the mobile phone and the Bluetooth peripheral is maintained, the SCO link between the mobile phone and the Bluetooth peripheral is interrupted, to trigger the Bluetooth peripheral to turn off the microphone.

Referring to FIG. 7A and FIG. 7B, it can be seen that, when the user triggers stop of the audio and video service implemented through the APP, the mobile phone may receive the microphone turn-off instruction initiated by the APP and used for triggering off of the microphone. Further, the mobile phone may detect, in response to the microphone turn-off request, whether the Bluetooth connection between the mobile phone and the Bluetooth peripheral is maintained, and then turn off the microphone of the mobile phone or the microphone of the Bluetooth peripheral according to an actual situation.

In this way, when the audio and video service implemented through the APP ends, a mobile phone may trigger disabling of a voice acquisition function of a microphone according to an actual situation, thereby meeting an actual use requirement of the user and improving the user experience.

Figure 8:
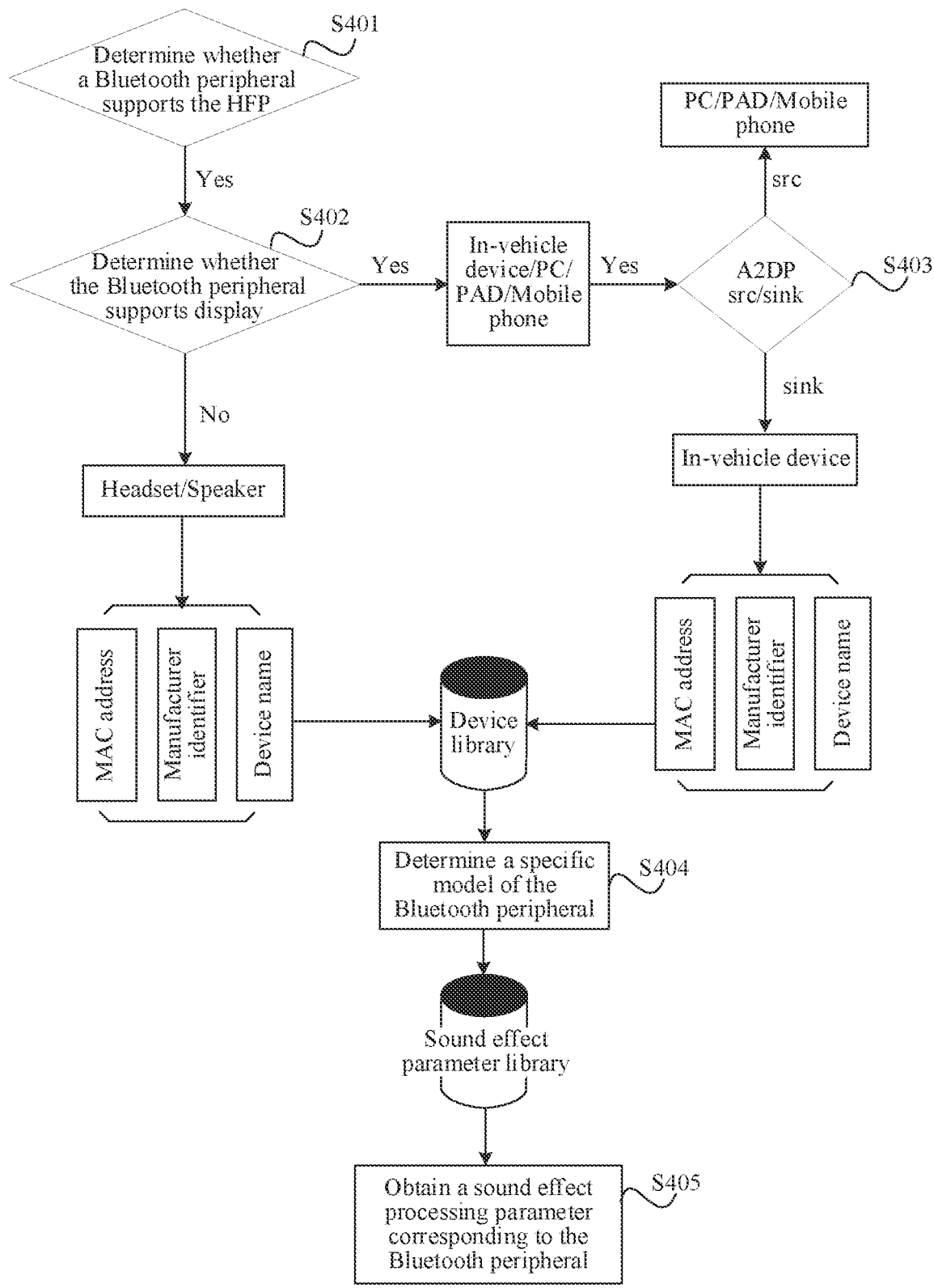
FIG. 8 is a fourth schematic flowchart of a sound pickup method for a terminal device through a Bluetooth peripheral according to an embodiment of this application.

An implementation process of determining a sound effect processing parameter corresponding to the Bluetooth peripheral in the sound pickup method for a terminal device through a Bluetooth peripheral provided in the embodiments of this application is exemplarily described below with reference to FIG. 8. As shown in FIG. 8, the implementation process includes the following steps S401 to S405.

S401: The mobile phone determines whether the Bluetooth peripheral supports the HFP profile.

Exemplarily, the audio algorithm module of the mobile phone may pre-query device-related information of a current Bluetooth peripheral, and may further determine, according to the device-related information of the Bluetooth peripheral, whether the Bluetooth peripheral supports the HFP profile.

The following step S402 is performed in a case that the Bluetooth peripheral supports the HFP profile; or sound pickup is performed through the microphone of the mobile phone in a case that the Bluetooth peripheral does not support the HFP profile.

S402: The mobile phone determines whether the Bluetooth peripheral supports a display function.

In a case that the Bluetooth peripheral supports the display function, the mobile phone may determine that the Bluetooth peripheral is of a device type such as an in-vehicle device/PC/PDA/mobile phone; and in a case that the Bluetooth peripheral does not support the display function, the mobile phone may determine that the Bluetooth peripheral is of a device type such as a headset/speaker.

S403: Determine, in a case that the Bluetooth peripheral is determined to be of the device type such as the in-vehicle device/PC/PDA/mobile phone, whether the Bluetooth peripheral is used as an src end (a source end) or a sink end (a sink end) of an A2DP profile.

In a case that the Bluetooth peripheral is used as the src end of the A2DP profile, the mobile phone may determine that the Bluetooth peripheral is of the type such as the PC/PDA/mobile phone; and in a case that the Bluetooth peripheral is used as the sink end of the A2DP profile, the mobile phone may determine that the Bluetooth peripheral is of the in-vehicle device type.

S404: The mobile phone determines, according to the device-related information of the Bluetooth peripheral, a specific model of the Bluetooth peripheral from a preset device library.

For example, assuming that the Bluetooth peripheral is of the device type such as the headset/speaker, the mobile phone may determine a specific headset model/specific speaker model from the preset device library.

In another example, assuming that the Bluetooth peripheral is of the in-vehicle device type, the mobile phone may determine a specific vehicle model from the preset device library.

In this embodiment of this application, the audio algorithm module of the mobile phone pre-queries information such as a manufacturer identifier, a device type, and I/O capability of a current Bluetooth peripheral, classifies the Bluetooth peripheral as an in-vehicle Bluetooth device or a common Bluetooth device (such as a Bluetooth headset or speaker), and then identifies a specific device model of the Bluetooth peripheral according to a MAC address, the manufacturer identifier, and the device name of the Bluetooth peripheral.

It is to be noted that, a general parameter of such a device type may be used in a case that the Bluetooth peripheral cannot match a model from any manufacturer.

S405: The mobile phone determines, according to the specific model of the Bluetooth peripheral, a sound effect processing parameter corresponding to the Bluetooth peripheral from the preset sound effect parameter library.

Compared with the related art, in the solution of this application, procedures of sound effect processing are added. A device classification manner is newly added. To be specific, different sound effect DRC parameters may be used for Bluetooth peripherals of different types, and for a device that cannot be classified as a specific model, a general sound effect parameter of such a category can be used.

In this way, after the Bluetooth module of the mobile phone inputs an audio stream into the audio algorithm module, the audio algorithm module performs sound effect processing on the audio stream by using the sound effect processing parameter. Specifically, the audio algorithm module may select a corresponding sound effect processing parameter for the Bluetooth peripheral, where the sound effect processing parameter may be embodied as an adjustment DRC parameter.

In the embodiments of this application, the solutions of this application can not only be applied to achievement of a TWS spatial stereo effect, but also can be popularized and applied to a Bluetooth speaker or any other Bluetooth peripheral.

It is to be further noted that, in the embodiments of this application, "greater than" may be replaced with "greater than or equal to", and "less than or equal to" may be replaced with "less than". Alternatively, "greater than or equal to" may be replaced with "greater than", and "less than" may be replaced with "less than or equal to".

Each embodiment described herein may be an independent solution, or may be combined according to an internal logic, and such solutions all fall within the protection scope of this application.

It may be understood that, the methods and operations implemented by the terminal device in the foregoing method embodiments may also be implemented by a component (for example, a chip or a circuit) that can be used in the terminal device.

The method embodiments provided in this application are described above, and apparatus embodiments provided in this application are described below. It should be understood that, the descriptions of the apparatus embodiments correspond to the descriptions of the method embodiments. Therefore, for content not described in detail, reference may be made to the foregoing method embodiments. For brevity, details are not described herein again.

The solutions provided in the embodiments of this application are mainly described above from a perspective of method steps. It may be understood that, to implement the foregoing functions, the terminal device implementing the method includes corresponding hardware structures and/or software modules for performing the functions. A person skilled in the art may be aware that, in combination with the units and algorithm steps of the examples described in the embodiments disclosed in this specification, this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the protection scope of this application.

In this embodiment of this application, functional modules of the terminal device may be divided according to the foregoing method examples. For example, the functional modules may be divided corresponding to various functions, or two or more functions may be integrated into one processing module. The integrated module may be implemented in the form of hardware, or may be implemented in the form of a software functional module. It is to be noted that, module division in the embodiments of this application is an example, and is only logical function division. During actual implementation, there may be another division manner. The following descriptions are made by using an example in which function modules are divided corresponding to functions.

Figure 9:
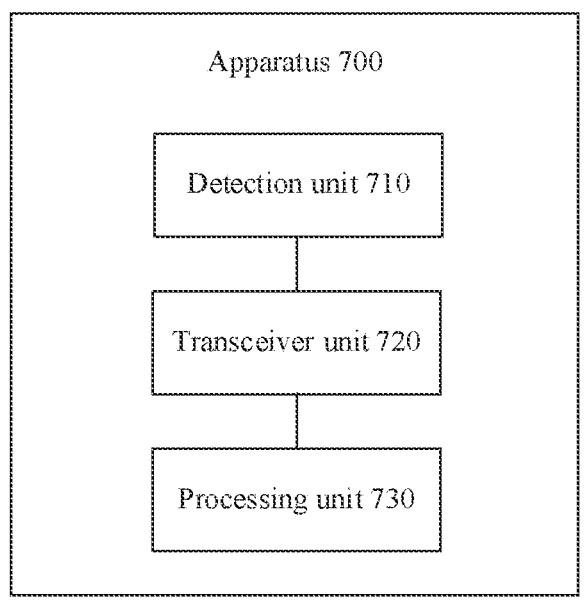
FIG. 9 is a schematic structural diagram of a sound pickup apparatus for a terminal device through a Bluetooth peripheral according to an embodiment of this application.

FIG. 9 is a schematic block diagram of a sound pickup apparatus 700 for a terminal device through a Bluetooth peripheral according to an embodiment of this application. The apparatus 700 may be configured to perform actions performed by the terminal device in the foregoing method embodiments. The apparatus 700 includes a detection unit 710, a transceiver unit 720, and a processing unit 730.

The detection unit 710 is configured to detect a first operation performed by a user on the apparatus 700, where the first operation is used for triggering a first APP in the apparatus 700 to activate an audio and video service, or triggering recoding through a target Bluetooth device in a case that the first APP has activated the audio and video service.

The transceiver unit 720 is configured to send a microphone recording instruction to the target Bluetooth device in response to the first operation performed by the user, to instruct the target Bluetooth device to record, where the target Bluetooth device is a first Bluetooth device or a second Bluetooth device that establishes a Bluetooth connection to the apparatus 700.

The processing unit 730 is configured to perform, in a case that the transceiver unit 720 receives a first audio data stream sent by the first Bluetooth device, sound effect processing on the first audio data stream by using a first sound effect DRC parameter, where the first audio data stream corresponds to sound data acquired by a microphone of the first Bluetooth device, and the first sound effect DRC parameter is a preset sound effect processing parameter corresponding to the first Bluetooth device.

The processing unit 730 is further configured to perform, in a case that the transceiver unit 720 receives a second audio data stream sent by the second Bluetooth device, sound effect processing on the second audio data stream by using a second sound effect DRC parameter, where the second audio data stream corresponds to sound data acquired by a microphone of the second Bluetooth device, and the second sound effect DRC parameter is a preset sound effect processing parameter corresponding to the second Bluetooth device.

The first Bluetooth device and the second Bluetooth device have different device types or device models, and the first sound effect DRC parameter is different from the second sound effect DRC parameter.

Different sound effect DRC parameters may be used for Bluetooth peripherals of different types or models, so that a sound effect dynamic range may be adjusted according to specific situations, thereby better improving the sound effect.

According to the sound pickup method for an apparatus 700 through a Bluetooth peripheral provided in this application, in a scenario where the apparatus 700 performs the audio and video service such as livestreaming or video calling, the apparatus 700 may pick up sound data through a microphone of the Bluetooth peripheral, and may perform targeted sound effect processing on the sound data picked up by the Bluetooth peripheral by using a preset sound effect DRC parameter corresponding to the Bluetooth peripheral, thereby improving the sound effect. By using the solution in this application, the apparatus 700 may not only pick up sound through the Bluetooth peripheral, but also perform sound effect processing for different Bluetooth peripherals by using different preset sound effect DRC parameters respectively, to improve the sound effect of the sound picked up through the Bluetooth peripheral, so that a better recording effect can be achieved even if the apparatus 700 is relatively far away from a photographed person or environmental noise surrounding the apparatus is relatively large, thereby improving the user experience.

In a possible implementation, a sound effect parameter library is preset in the apparatus 700 and includes a one-to-one correspondence between Bluetooth device information and a sound effect processing parameter. The sound effect parameter library may include a correspondence between device information of the first Bluetooth device and the first sound effect DRC parameter and a correspondence between device information of the second Bluetooth device and the second sound effect DRC parameter.

Optionally, the processing unit 730 is further configured to determine, according to device information of the target Bluetooth device, a target sound effect DRC parameter corresponding to the target Blue-tooth device from the sound effect parameter library. The device information includes a device name, a MAC address, a manufacturer identifier, and input/output I/O capability information.

In a possible implementation, the sound effect parameter library may include a one-to-one correspondence between a device type of a target Bluetooth device and a target sound effect DRC parameter.

In a possible implementation, the sound effect parameter library may include a one-to-one correspondence between a device model of the target Bluetooth device and the target sound effect DRC parameter.

Optionally, the processing unit 730 is further configured to determine a device type or a device model of the target Bluetooth device according to device information of the target Bluetooth device, and then determine a sound effect DRC parameter corresponding to the target Bluetooth device according to the device type or the device model of the target Bluetooth device.

Exemplarily, the processing unit 730 is further configured to:
- determine a device model of the target Bluetooth device according to a device name, a MAC address, and a manufacturer identifier of the target Bluetooth device; and
- determine, according to the device model of the target Bluetooth device, a target sound effect DRC parameter corresponding to the target Bluetooth device from the sound effect parameter library.

By using the foregoing solution, during sound pickup (such as recording) through the Bluetooth peripheral, for Bluetooth peripherals of different device models, the apparatus 700 may perform sound effect processing on an audio stream obtained by the Bluetooth peripheral by using different preset sound effect DRC parameters, thereby achieving a better recording effect.

In a possible implementation, the processing unit 730 is further configured to:
- determine a device type of the target Bluetooth device according to input/output I/O capability information of the target Bluetooth device; and
- determine, according to the device type of the target Bluetooth device, a target sound effect DRC parameter corresponding to the target Bluetooth device from the sound effect parameter library.

The device type may include a screen type and a non-screen type.

By using the foregoing solution, during sound pickup (such as recording) through the Bluetooth peripheral, for Bluetooth peripherals of different device types (such as the screen type or the non-screen type), the apparatus 700 may perform sound effect processing on an audio stream obtained by the Bluetooth peripheral by using different preset sound effect DRC parameters, thereby achieving a better recording effect.

In a possible implementation, a Bluetooth device of the non-screen type may include a headset or a speaker having a voice acquisition function, and a Bluetooth device of the screen type may include an in-vehicle terminal or a portable terminal having a display screen and the voice acquisition function. It is to be noted that, descriptions herein are merely exemplary, and this application is not limited thereto. In addition, another possible Bluetooth device may be further included and may be specifically determined according to an actual use condition, and this is not limited in the embodiments of this application.

In a possible implementation, in a case that the target Bluetooth device is a Bluetooth device of the screen type, the processing unit 730 is further configured to:
- determine that the target Bluetooth device is of a voice output end type in a case that the target Bluetooth device is used as an output end of an audio data stream in an advanced audio distribution profile A2DP; or
- determine that the target Bluetooth device is of a voice receiving end type in a case that the target Bluetooth device is used as a receiving end of the audio data stream in the A2DP profile.

By using the foregoing solution, during sound pickup (such as recording) through the Bluetooth peripheral, for the Bluetooth peripheral of the screen type, the apparatus 700 may distinguish whether the Bluetooth peripheral is of the voice output end type or the voice receiving end type, and then perform sound effect processing on the audio stream obtained by the Bluetooth peripheral by using a corresponding preset sound effect DRC parameter, thereby achieving a better recording effect.

In a possible implementation, the foregoing transceiver unit 720 is further configured to:
- send, in response to the first operation performed by the user on the apparatus 700, a microphone recording instruction to the target Bluetooth device in a case that the processing unit 730 determines that the target Bluetooth device meets a preset condition, to instruct the target Bluetooth device to record.

The preset condition may be that the target Bluetooth device is in a user wearing state, and/or a distance between the target Bluetooth device and the apparatus 700 is greater than a preset distance threshold. The preset distance threshold may be set according to an actual use requirement. This is not limited in the embodiments of this application.

By using the foregoing solution, when finding that a connection to the Bluetooth device is established, the apparatus 700 may determine whether the Bluetooth peripheral meets the preset condition, for example, the Bluetooth device is in the user wearing state and/or a distance between the Bluetooth device and the apparatus 700 is greater than the preset distance threshold. In a case that the Bluetooth device meets the preset condition (for example, the Bluetooth device is in the user wearing state), the apparatus 700 prompts the user Whether it is necessary to pick up voice data (such as record) through a microphone of the Bluetooth device, for the user to select. In this way, user requirements can be better met, thereby improving the user experience.

Optionally, in this embodiment of this application, in a case that the apparatus 700 processes the audio and video service and picks up voice data through the microphone of the Bluetooth device, the apparatus 700 may determine in real time whether the Bluetooth device meets the preset condition. In a case that the Bluetooth device does not meet the preset condition, for example, the Bluetooth device is in a user non-wearing state, the apparatus 700 prompts the user whether it is necessary to switch from picking up voice data through the microphone of the Bluetooth device to picking up voice data through the microphone of the apparatus 700, for the user to select. In this way, user requirements can be better met, thereby improving the user experience.

In a possible implementation, the instructing, in response to a first operation performed by a user on the apparatus 700, a target Bluetooth device to record includes:
- in response to the first operation, sending, in a case that the target Bluetooth device supports a hands-free profile HFP, a microphone recording instruction to the target Bluetooth device, to instruct the target Bluetooth device to record.

By using the foregoing solution, in a case that the Bluetooth peripheral supports the HFP, the Bluetooth peripheral may directly enable a microphone recording function in response to the microphone recording instruction sent by the apparatus 700, so that the user does not need to manually trigger recording, thereby improving the user experience.

In a possible implementation, the transceiver unit 720 is further configured to:
- prompt, in response to the first operation performed by the user on the apparatus 700, the user whether to record through a microphone of the target Bluetooth device;

receive a second operation performed by the user, where the second operation is used for determining to record through the microphone of the target Bluetooth device; and send, in response to the second operation, the microphone recording instruction to the target Bluetooth device to instruct the target Bluetooth device to record.

By using the solution in this application, when processing the audio and video service, the apparatus 700 may achieve a better sound pickup effect by using the Bluetooth peripheral connected to the apparatus 700 even if the apparatus 700 is relatively far away from the photographed person or the environmental noise surrounding the apparatus is relatively large, thereby improving the user experience.

In a possible implementation, the transceiver unit 720 is further configured to: interact with the target Bluetooth device, to cause the apparatus 700 to establish an SCO link to the target Bluetooth device; and the transceiver unit 720 is further configured to receive a response message sent by the target Bluetooth device, where the response message is used for indicating that the microphone of the target Bluetooth device is turned on.

In this embodiment of this application, the apparatus 700 sends a microphone turn-on instruction to the Bluetooth peripheral, that is, the apparatus 700 initiates establishment of the SCO link to the Bluetooth peripheral, to instruct the Bluetooth peripheral to turn on the microphone. Further, after turning on the microphone, the Bluetooth peripheral may send, to the apparatus 700, the response message for indicating that the microphone of the Bluetooth peripheral is turned on.

The apparatus 700 establishes the SCO link to the Bluetooth peripheral, to directly trigger the Bluetooth peripheral to turn on the microphone. That is, in a case that the SCO link is established between the apparatus 700 and the Bluetooth peripheral, it is considered by default that the Bluetooth peripheral has turned on the microphone. In this case, the Bluetooth peripheral has a function of picking up voice data and transmitting the picked-up voice data to the apparatus 700 in real time.

In a possible implementation, the apparatus 700 further includes an image capture unit, configured to: in response to the first operation performed by the user, obtain a first image by capturing through a camera of the apparatus 700 in a process of acquiring a target audio data stream by recording through the target Bluetooth device; and the processing unit 730 is further configured to synthesize the first image and a processed target audio data stream to obtain a first video stream.

By using the solution in this application, when performing the audio and video service such as livestreaming or video calling, the apparatus 700 may achieve a better video recording effect by using the Bluetooth peripheral connected to the apparatus 700 even if the apparatus 700 device is relatively far away from the photographed person or the environmental noise surrounding the apparatus is relatively large, thereby improving the user experience.

In a possible implementation, the detection unit 710 is further configured to:

receive a microphone state query request initiated by the first APP, where the microphone state query request is used for querying whether the microphone is in a turn-on state;

detect, in response to the microphone state query request, whether the Bluetooth connection between the apparatus 700 and the target Bluetooth device is maintained;

in a case that the Bluetooth connection between the apparatus 700 and the target Bluetooth device is interrupted, detect whether a microphone of the apparatus 700 is turned on and feed back a detection result to the first APP; and in a case that the Bluetooth connection and the SCO link between the apparatus 700 and the target Bluetooth device are maintained, feed back to the first APP that the microphone is in the turn-on state.

In this way, when learning that the microphone is in the turn-on state, the first APP may continue to perform audio and video recording or calling. When learning that the microphone is in a turn-off state, the first APP may re-trigger on of the microphone, to ensure that the audio and video service initiated by the first APP can be normally performed, thereby improving the user experience.

In a possible implementation, the detection unit 710 is further configured to:

receive a microphone turn-off request initiated by the first APP, where the microphone turn-off request is used for triggering off of the microphone; and detect, in response to the microphone turn-off request, whether the Bluetooth connection between the apparatus 700 and the target Bluetooth device is maintained.

Further, the processing unit 730 is further configured to:

in a case that the Bluetooth connection between the apparatus 700 and the target Bluetooth device is maintained, interrupt the SCO link between the apparatus 700 and the target Bluetooth device to trigger the target Bluetooth device to turn off the microphone; and turn off the microphone of the apparatus 700 in a case that the Bluetooth connection between the apparatus 700 and the target Bluetooth device is interrupted and the microphone of the apparatus 700 is in the turn-on state.

In this way, when the audio and video service implemented through the APP ends, a mobile phone may trigger disabling of a voice acquisition function of a microphone according to an actual situation, thereby meeting an actual use requirement of the user and improving the user experience.

In a possible implementation, the processing unit 730 is further configured to:

route the processed first audio data stream or the processed second audio data stream to a storage path corresponding to the first APP.

By using the solution in this application, when the apparatus 700 performs the audio and video service through the first APP, the apparatus 700 may not only pick up sound through the Bluetooth peripheral, but also perform sound effect processing for different Bluetooth peripherals by using different preset sound effect DRC parameters respectively, to obtain an audio stream with improved sound quality for further application by the APP.

In a possible implementation, the processing unit 730 is further configured to:

turn on, in response to the first operation performed by the user, the microphone of the apparatus 700 in a case that the apparatus 700 does not establish the Bluetooth connection to the target Bluetooth device, or has established the Bluetooth connection to the target Bluetooth device but the target Bluetooth device does not support the HFP profile;

acquire sound data through the microphone of the apparatus 700, to obtain a third audio data stream;

process the third audio data stream to obtain a processed third audio data stream; and route the processed third audio data stream to the storage path corresponding to the first APP.

In the embodiments of this application, when performing the audio and video service, the apparatus 700 may select to pick up sound through the microphone of the mobile phone or through the microphone of the Bluetooth peripheral according to an actual application scenario, thereby improving the sound pickup effect. In addition, in this embodiment of this application, sound effect processing is performed on the audio stream picked up by the microphone of the Bluetooth peripheral by using a sound effect processing parameter preset for the Bluetooth peripheral of such a type, thereby improving the audio quality.

The apparatus 700 according to this embodiment of this application may correspondingly perform the method described in the embodiments of this application, and the foregoing and other operations and/or functions of the units in the apparatus 700 are respectively used for implementing corresponding procedures in the method. For brevity, details are not described herein again.

Figure 10:
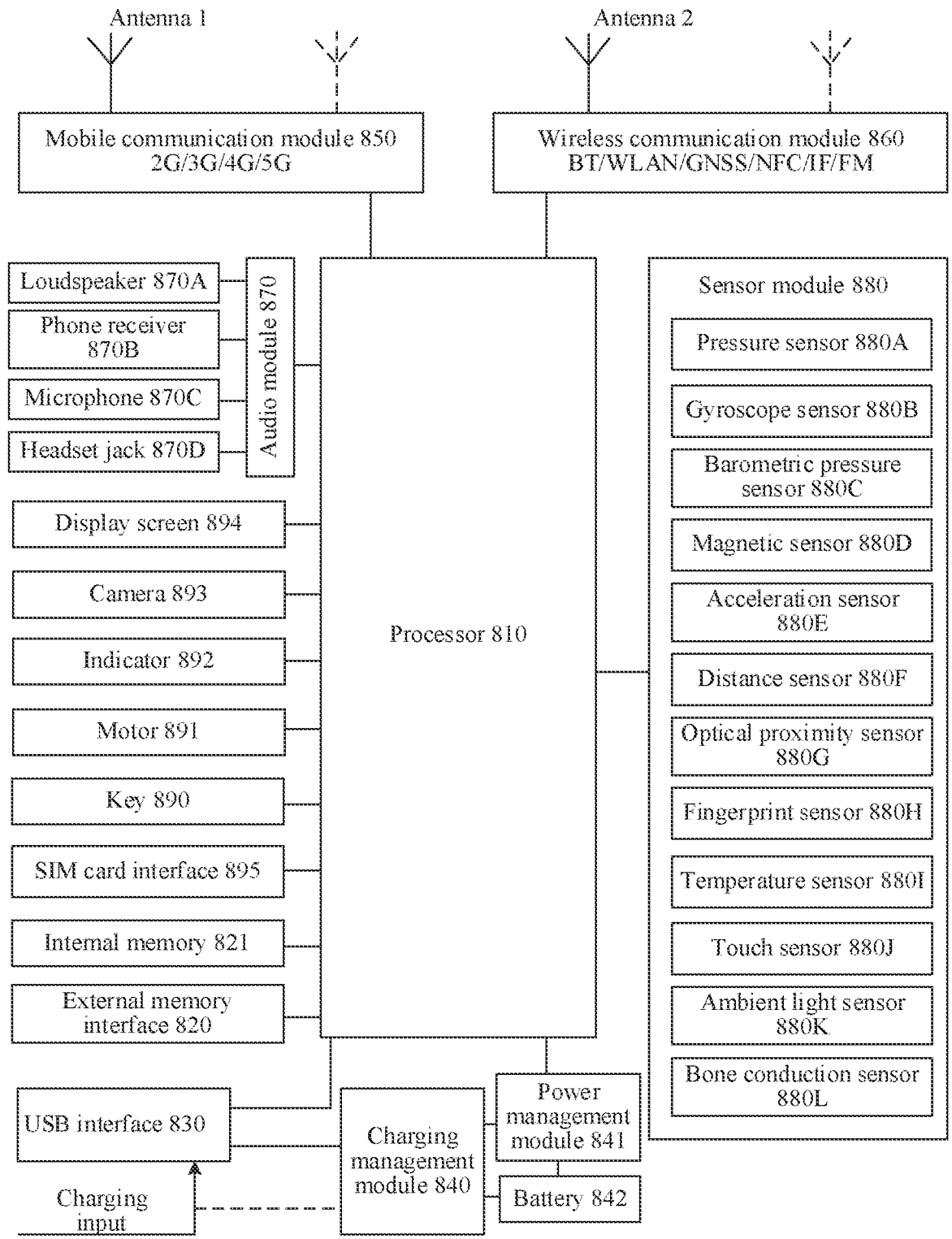
FIG. 10 is a schematic structural diagram of an electronic device according to an embodiment of this application.

FIG. 10 is a schematic structural diagram of an electronic device 800 according to an embodiment of this application. The electronic device 800 may be the terminal device or the Bluetooth device mentioned in the foregoing embodiments.

The electronic device 800 may include a processor 810, an external memory interface 820, an internal memory 821, a universal serial bus (universal serial bus, USB) interface 830, a charging management module 840, a power management unit 841, a battery 842, an antenna 1, an antenna 2, a mobile communication module 850, a wireless communication module 860, an audio module 870, a loudspeaker 870A, a phone receiver 870B, a microphone 870C, a headset jack 870D, a sensor module 880, a key 890, a motor 891, an indicator 892, a camera 893, a display screen 894, a subscriber identity module (subscriber identification module, SIM) card interface 895, and the like. The sensor module 880 may include a pressure sensor 880A, a gyroscope sensor 880B, a barometric pressure sensor 880C, a magnetic sensor 880D, an acceleration sensor 880E, a distance sensor 880F, an optical proximity sensor 880G, a fingerprint sensor 880H, a temperature sensor 880I, a touch sensor 880J, an ambient light sensor 880K, a bone conduction sensor 880L, and the like.

It may be understood that the schematic structure in this embodiment of this application constitutes no specific limitation on the electronic device 800. The electronic device 800 may include more or fewer components than those shown in the figure, or some components may be combined, or some components may be split, or a different component deployment may be used. The components shown in the figure may be implemented by hardware, software, or a combination of software and hardware.

The processor 810 may include one or more processing units. For example, the processor 810 may include an application processor (application processor, AP), a modem processor (modem), a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors. A memory may be further arranged in the processor 810 to store instructions and data.

A wireless communication function of the electronic device 800 may be implemented by using the antenna 1, the antenna 2, the mobile communication module 850, the wireless communication module 860, the modem processor, the baseband processor, and the like.

The antenna 1 and the antenna 2 are configured to transmit or receive an electromagnetic wave signal. Each antenna in the electronic device 800 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 850 may provide a solution to wireless communication such as 2G/3G/4G/5G applied to the electronic device 800. The mobile communication module 850 may include at least one filter, a switch, a power amplifier, a low noise amplifier (low noise amplifier, LNA), and the like. The mobile communication module 850 may receive an electromagnetic wave through the antenna 1, perform processing such as filtering and amplification on the received electromagnetic wave, and transmit a processed electromagnetic wave to the modem processor for demodulation. The mobile communication module 850 may further amplify a signal modulated by the modem processor, and convert the signal into an electromagnetic wave for radiation through the antenna 1. In some embodiments, at least some functional modules of the mobile communication module 850 may be arranged in the processor 810. In some embodiments, at least some functional modules of the mobile communication module 850 and at least some modules of the processor 810 may be arranged in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the loudspeaker 870A, the phone receiver 870B, and the like), or displays an image or a video through the display screen 894. In some embodiments, the modem processor may be an independent device. In some other embodiments, the modem processor may be independent of the processor 810, and the modem processor and the mobile communication module 850 or another functional module may be arranged in the same component. In some embodiments, the electronic device 800 may include two modem processors, where one corresponds to 4G, and the other corresponds to 5G.

The wireless communication module 860 may provide a solution for wireless communication to be applied to the electronic device 800, including a wireless local area network (wireless local area network, WLAN) (such as a wireless fidelity (wireless fidelity, Wi-Fi) network), Bluetooth (Bluetooth, BT), and the like. The wireless communication module 860 may be one or more devices integrating at least one communication processing module. The wireless communication module 860 receives an electromagnetic wave by using the antenna 2, performs frequency modulation and filtering processing on an electromagnetic wave signal, and sends a processed signal to the processor 810. The wireless communication module 860 may alternatively receive a to-be-sent signal from the processor 810, perform frequency modulation and amplification on the to-be-sent signal, and convert the signal into an electromagnetic wave for radiation by using the antenna 2.

In some embodiments, in the electronic device 800, the antenna 1 is coupled to the mobile communication module 850, and the antenna 2 is coupled to the wireless communication module 860, so that the electronic device 800 may communicate with a network and another device by using a wireless communication technology. The wireless communication technology may include technologies such as GSM, GPRS, CDMA, WCDMA, TD-SCDMA, LTE, NR, BT, WLAN, NFC, FM, and/or IR.

The electronic device 800 implements a display function by using the GPU, the display screen 894, the application processor, and the like. The GPU is a microprocessor for image processing, and is connected to the display screen 894 and the application processor. The GPU is configured to perform mathematical and geometric calculation, and is configured to render graphics. The processor 810 may include one or more GPUs, and execute program instructions to generate or change display information.

The display screen 894 is configured to display an image, a video, and the like. The display screen 894 includes a display panel.

The electronic device 800 may implement a photographing function by using the ISP, the camera 893, the video codec, the GPU, the display screen 894, the application processor, and the like. The ISP is configured to process data fed back by the camera 893. The camera 893 is configured to capture a static image or a video. The digital signal processor is configured to process a digital signal, and may further process another digital signal in addition to a digital image signal. For example, when the electronic device 800 performs frequency selection, the digital signal processor is configured to perform Fourier transform and the like on frequency energy. The video codec is configured to compress or decompress a digital video.

The internal memory 821 may be configured to store computer executable program code, and the executable program code includes instructions. The internal memory 821 may include a program storage region and a data storage region. The program storage area may store an operating system, an application required by at least one function (for example, a sound playing function or an image playing function), and the like.

The electronic device 800 may implement an audio function, for example, music playback or recording, by using the audio module 870, the loudspeaker 870A, the phone receiver 870B, the microphone 870C, the headset jack 870D, the application processor, and the like.

The pressure sensor 880A is configured to sense a pressure signal, and may convert the pressure signal into an electrical signal. In some embodiments, the pressure sensor 880A may be arranged in the display screen 894.

The touch sensor 880J is also referred to as a "touch panel". The touch sensor 880J may be arranged on the display screen 894. The touch sensor 880J and the display screen 894 form a touchscreen, which is also referred to as a "touch screen". The touch sensor 880J is configured to detect a touch operation performed on or near the touch sensor 880J. The touch sensor may transmit the detected touch operation to the application processor, to determine a touch event type. A visual output related to the touch operation may be provided through the display screen 894. In some other embodiments, the touch sensor 880J may alternatively be arranged on a surface of the electronic device 800 at a position different from that of the display screen 894.

The SIM card interface 895 is configured to connect to a SIM card. The SIM card may be inserted into the SIM card interface 895 or plugged from the SIM card interface 895, to come into contact with or be separated from the electronic device 800. The electronic device 800 may support one or N SIM card interfaces, where N is a positive integer greater than 1. The SIM card interface 895 can support a Nano SIM card, a micro SIM card, a SIM card, and the like. A plurality of cards may all be inserted into the same SIM card interface 895. The plurality of cards may be of the same type or different types. The SIM card interface 895 may be further compatible with different types of SIM cards. The SIM card interface 895 may also be compatible with an external memory card. The electronic device 800 interacts with a network by using a SIM card, to implement functions such as a call and data communication. In some embodiments, the electronic device 800 uses an eSIM, that is, an embedded SIM card. The eSIM card may be embedded in the electronic device 800 and cannot be separated from the electronic device 800.

In this embodiment of this application, the SIM card is configured to store user information, where the user information may include IMSI. The electronic device 800 may register with a network by using the user information as an identity.

The electronic device 800 in this embodiment of this application may be a smartphone (for example, a mobile phone equipped with an Android system or an iOS system), a tablet computer, a notebook computer, a palmtop computer, a mobile internet device (MID, mobile internet device), a wearable device (for example, a smart watch or a smart band) or another device that can access the Internet.

It may be understood that, components shown in FIG. 10 do not constitute a specific limitation on the electronic device 800. The electronic device 800 may further include more or fewer components than those shown in the figure, or some components may be combined, or some components may be separated, or a different component deployment may be used.

It should be understood that, the electronic device 800 in this embodiment of this application may correspond to the apparatus 700 in the embodiments of this application, the processor 810 in the electronic device 800 may correspond to the processing unit 730 in the apparatus 700, the sensor module 880 in the electronic device 800 may correspond to the detection unit 710 in the apparatus 700, and the wireless communication module 860 in the electronic device 800 may correspond to the transceiver unit 720 in the apparatus 700. The foregoing and other operations and/or functions of the units in the apparatus 700 are respectively used for implementing corresponding procedures in the foregoing method. For brevity, details are not described herein again.

Optionally, in some embodiments, the embodiments of this application further provide a computer-readable medium, storing program code, the computer program code, when run on a computer, causing the computer to perform the method according to the foregoing aspects.

Optionally, in some embodiments, the embodiments of this application further provide a chip, including a processor, coupled to a memory and configured to execute a computer program or instructions stored in the memory, to cause the chip to perform the method according to the foregoing aspects.

Optionally, in some embodiments, the embodiments of this application further provide a computer program product, including computer program code, the computer program code, when run on a computer, causing the computer to perform the method according to the foregoing aspects.

In the embodiments of this application, the terminal device or the Bluetooth device includes a hardware layer, an operating system layer running on the hardware layer, and an application layer running on the operating system layer. The hardware layer may include hardware such as a central processing unit (central processing unit, CPU), a memory management unit (memory management unit, MMU), and a memory (which is also referred to as a main memory). The operating system of the operating system layer may be any one or more computer operating systems such as a Linux operating system, a Unix operating system, an Android operating system, an iOS operating system, or a Windows operating system that implement service processing by using a process (process). The application layer includes an application such as a browser, an address book, word processing software, or instant messaging software.

The embodiments of this application do not specifically limit a specific structure of an execution entity of the methods provided in the embodiments of this application, as long as the program in which the codes of the methods provided in the embodiments of this application are recorded can be executed to communicate according to the embodiments of this application. For example, the execution entity of the method provided in the embodiments of this application may be a terminal device or a Bluetooth device, or may be functional modules in the terminal device or the Bluetooth device that can invoke a program and execute the program.

Aspects or features of this application may be implemented as a method, an apparatus or a product that uses standard programming and/or engineering technologies. The term "product" used in this specification may cover a computer program that can be accessed from any computer readable component, carrier or medium. For example, the computer-readable medium may include but is not limited to: a magnetic storage component (such as a hard disk, a floppy disk, or a magnetic tape), an optical disc (for example, a compact disc (compact disc, CD), or a digital versatile disc (digital versatile disc, DVD)), a smart card, and a flash memory component (such as an erasable programmable read-only memory (erasable programmable read-only memory, EPROM), a card, a stick, or a key drive).

Various storage media described in this specification may indicate one or more devices and/or other machine-readable media that is used to store information. The term "machine readable media" may include but is not limited to a radio channel, and various other media that can store, contain and/or carry an instruction and/or data.

It should be understood that, the processor mentioned in the embodiments of this application may be a central processing unit (central processing unit, CPU), or may be another general-purpose processor, a digital signal processor (digital signal processor, DSP), an application-specific integrated circuit (application-specific integrated circuit, ASIC), a field-programmable gate array (field-programmable gate array, FPGA), or another programmable logic device, a discrete gate or a transistor logic device, a discrete hardware component, or the like. The general-purpose processor may be a microprocessor, or the processor may be any conventional processor and the like.

It may be further understood that the memory mentioned in the embodiments of this application may be a volatile memory or a non-volatile memory, or may include a volatile memory and a non-volatile memory. The non-volatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (random access memory, RAM). For example, the RAM may be used as an external cache. By way of example, and not limitation, the RAM may include the following various forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It is to be noted that, when the processor is a general-purpose processor, a DSP, an ASIC, an FPGA, or another programmable logic device, a discrete gate or a transistor logic device, or a discrete hardware component, the memory (a storage module) may be integrated into the processor.

It is to be further noted that, the memory described herein aims to include but not limited to these memories and any other suitable types of memories.

A person of ordinary skill in the art may be aware that the units and steps in the examples described with reference to the embodiments disclosed in this specification can be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the protection scope of this application.

A person skilled in the art may clearly understand that for convenience and conciseness of description, for specific working processes of the foregoing described system, apparatus and unit, reference may be made to the corresponding processes in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

If implemented in the form of software functional units and sold or used as an independent product, the functions may also be stored in a computer-readable storage medium. Based on such an understanding, the technical solutions of this application essentially, or the part contributing to the prior art, or some of the technical solutions may be implemented in a form of a computer software product. The computer software product is stored in a storage medium, and includes several instructions for instructing a computer device (which may be a personal computer, a server, a Bluetooth device, or the like) to perform all or some of the steps of the methods described in the embodiments of this application. The storage medium may include but is not limited to: various media that may store processing code, such as a USB flash drive, a removable hard disk, a ROM, a RAM, a magnetic disk, and an optical disc.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sound pickup method for a terminal device through a Bluetooth peripheral, comprising:
   instructing, by the terminal device in response to a first operation performed by a user on the terminal device, a target Bluetooth device to record, wherein the target Bluetooth device is a first Bluetooth device or a second Bluetooth device that has established a Bluetooth connection to the terminal device, and the first operation is used for triggering a first application (APP) in the terminal device to activate an audio and video service, or triggering recording through the target Bluetooth device in a case that the first APP has activated the audio and video service, wherein the instructing, by the terminal device in response to a first operation performed by a user on the terminal device, a target Bluetooth device to record comprises:
     in response to the first operation performed by the user on the terminal device, instructing, by the terminal device in a case that the terminal device determines that the target Bluetooth device meets a preset condition, the target Bluetooth device to record, wherein the preset condition is at least one of that the target Bluetooth device is in a user wearing state or a distance between the target Bluetooth device and the terminal device is greater than a preset distance threshold;
   performing, by the terminal device in a case that the terminal device receives a first audio data stream sent by the first Bluetooth device, sound effect processing on the first audio data stream by using a first sound effect dynamic range control (DRC) parameter, wherein the first audio data stream corresponds to sound data acquired by a microphone of the first Bluetooth device, and the first sound effect DRC parameter is a preset sound effect processing parameter corresponding to the first Bluetooth device; and
   performing, by the terminal device in a case that the terminal device receives a second audio data stream sent by the second Bluetooth device, sound effect processing on the second audio data stream by using a second sound effect DRC parameter, wherein the second audio data stream corresponds to sound data acquired by a microphone of the second Bluetooth device, and the second sound effect DRC parameter is a preset sound effect processing parameter corresponding to the second Bluetooth device, wherein
   the first Bluetooth device and the second Bluetooth device have different device types or device models, and the first sound effect DRC parameter is different from the second sound effect DRC parameter.

2. The method according to claim 1, wherein a sound effect parameter library is preset in the terminal device and comprises a one-to-one correspondence between Bluetooth device information and a sound effect processing parameter, wherein the sound effect parameter library comprises a correspondence between device information of the first Bluetooth device and the first sound effect DRC parameter and a correspondence between device information of the second Bluetooth device and the second sound effect DRC parameter; and
   the method further comprises:
     determining, by the terminal device according to device information of the target Bluetooth device, a target sound effect DRC parameter corresponding to the target Bluetooth device from the sound effect parameter library, wherein
     the device information comprises at least one of the following: a device name, a physical or MAC address, a manufacturer identifier, or input/output (I/O) capability information.

3. The method according to claim 2, wherein the determining, by the terminal device according to device information of the target Bluetooth device, a target sound effect DRC parameter corresponding to the target Bluetooth device from the sound effect parameter library comprises:
   determining, by the terminal device, a device model of the target Bluetooth device according to a device name, a MAC address, and a manufacturer identifier of the target Bluetooth device; and
   determining, by the terminal device according to the device model of the target Bluetooth device, the target sound effect DRC parameter corresponding to the target Bluetooth device from the sound effect parameter library, wherein
   the sound effect parameter library comprises a one-to-one correspondence between the device model of the target Bluetooth device and the target sound effect DRC parameter.

4. The method according to claim 2, wherein the determining, by the terminal device according to device information of the target Bluetooth device, a target sound effect DRC parameter corresponding to the target Bluetooth device from the sound effect parameter library comprises:
   determining, by the terminal device, a device type of the target Bluetooth device according to I/O capability information of the target Bluetooth device; and
   determining, by the terminal device according to the device type of the target Bluetooth device, the target sound effect DRC parameter corresponding to the target Bluetooth device from the sound effect parameter library, wherein the device type comprises a screen type and a non-screen type.

5. The method according to claim 1, wherein the instructing, by the terminal device in response to a first operation performed by a user on the terminal device, a target Bluetooth device to record comprises:

in response to the first operation, sending, by the terminal device in a case that the target Bluetooth device supports a hands-free profile (HFP), a microphone recording instruction to the target Bluetooth device to instruct the target Bluetooth device to record.

6. The method according to claim 1, wherein the instructing, by the terminal device in response to a first operation performed by a user on the terminal device, a target Bluetooth device to record comprises:

prompting, by the terminal device in response to the first operation performed by the user on the terminal device, the user whether to record through a microphone of the target Bluetooth device;

receiving, by the terminal device, a second operation performed by the user, wherein the second operation is used for determining to record through the microphone of the target Bluetooth device; and sending, by the terminal device in response to the second operation, the microphone recording instruction to the target Bluetooth device to instruct the target Bluetooth device to record.

7. The method according to claim 1, further comprising:

establishing a synchronous connection oriented (SCO) link between the terminal device and the target Bluetooth device; and receiving, by the terminal device, a response message sent by the target Bluetooth device, wherein the response message is used for indicating that the microphone of the target Bluetooth device is turned on.

8. The method according to claim 1, further comprising:

obtaining, by the terminal device, a first image by capturing through a camera in response to the first operation performed by the user and in a process of obtaining a target audio data stream by recording through the target Bluetooth device; and synthesizing, by the terminal device, the first image and a processed target audio data stream to obtain a first video stream.

9. The method according to claim 1, further comprising:

receiving, by the terminal device, a microphone turn-off request initiated by the first APP, wherein the microphone turn-off request is used for triggering off of the microphone;

detecting, by the terminal device in response to the microphone turn-off request, whether the Bluetooth connection between the terminal device and the target Bluetooth device is maintained;

in a case that the Bluetooth connection between the terminal device and the target Bluetooth device is maintained, interrupting, by the terminal device, the synchronous connection oriented (SCO) link between the terminal device and the target Bluetooth device to trigger the target Bluetooth device to turn off the microphone; and turning off, by the terminal device, the microphone of the terminal device in a case that the Bluetooth connection between the terminal device and the target Bluetooth device is interrupted and the microphone of the terminal device is in the turn-on state.

10. A terminal device, comprising a processor, coupled to a memory and configured to execute a computer program or instructions stored in the memory, to cause the terminal device to perform the following steps:

instructing, by the terminal device in response to a first operation performed by a user on the terminal device, a target Bluetooth device to record, wherein the target Bluetooth device is a first Bluetooth device or a second Bluetooth device that has established a Bluetooth connection to the terminal device, and the first operation is used for triggering a first application (APP) in the terminal device to activate an audio and video service, or triggering recording through the target Bluetooth device in a case that the first APP has activated the audio and video service, wherein the instructing, by the terminal device in response to a first operation performed by a user on the terminal device, a target Bluetooth device to record comprises:

in response to the first operation performed by the user on the terminal device, instructing, by the terminal device in a case that the terminal device determines that the target Bluetooth device meets a preset condition, the target Bluetooth device to record, wherein the preset condition is at least one of that the target Bluetooth device is in a user wearing state or a distance between the target Bluetooth device and the terminal device is greater than a preset distance threshold;

performing, by the terminal device in a case that the terminal device receives a first audio data stream sent by the first Bluetooth device, sound effect processing on the first audio data stream by using a first sound effect dynamic range control (DRC) parameter, wherein the first audio data stream corresponds to sound data acquired by a microphone of the first Bluetooth device, and the first sound effect DRC parameter is a preset sound effect processing parameter corresponding to the first Bluetooth device; and performing, by the terminal device in a case that the terminal device receives a second audio data stream sent by the second Bluetooth device, sound effect processing on the second audio data stream by using a second sound effect DRC parameter, wherein the second audio data stream corresponds to sound data acquired by a microphone of the second Bluetooth device, and the second sound effect DRC parameter is a preset sound effect processing parameter corresponding to the second Bluetooth device, wherein the first Bluetooth device and the second Bluetooth device have different device types or device models, and the first sound effect DRC parameter is different from the second sound effect DRC parameter.

11. The terminal device according to claim 10, wherein a sound effect parameter library is preset in the terminal device and comprises a one-to-one correspondence between Bluetooth device information and a sound effect processing parameter, wherein the sound effect parameter library comprises a correspondence between device information of the first Bluetooth device and the first sound effect DRC parameter and a correspondence between device information of the second Bluetooth device and the second sound effect DRC parameter; and the terminal device further comprises:

determining, by the terminal device according to device information of the target Bluetooth device, a target sound effect DRC parameter corresponding to the target Bluetooth device from the sound effect parameter library, wherein the device information comprises at least one of the following: a device name, a physical or MAC address, a manufacturer identifier, or input/output I/O capability information.

12. The terminal device according to claim 11, wherein the determining, by the terminal device according to device information of the target Bluetooth device, a target sound effect DRC parameter corresponding to the target Bluetooth device from the sound effect parameter library comprises:

determining, by the terminal device, a device model of the target Bluetooth device according to a device name, a MAC address, and a manufacturer identifier of the target Bluetooth device; and determining, by the terminal device according to the device model of the target Bluetooth device, the target sound effect DRC parameter corresponding to the target Bluetooth device from the sound effect parameter library, wherein the sound effect parameter library comprises a one-to-one correspondence between the device model of the target Bluetooth device and the target sound effect DRC parameter.

13. The terminal device according to claim 11, wherein the determining, by the terminal device according to device information of the target Bluetooth device, a target sound effect DRC parameter corresponding to the target Bluetooth device from the sound effect parameter library comprises:

determining, by the terminal device, a device type of the target Bluetooth device according to input/output I/O capability information of the target Bluetooth device; and determining, by the terminal device according to the device type of the target Bluetooth device, the target sound effect DRC parameter corresponding to the target Bluetooth device from the sound effect parameter library, wherein the device type comprises a screen type and a non-screen type.

14. The terminal device according to claim 1, wherein the instructing, by the terminal device in response to a first operation performed by a user on the terminal device, a target Bluetooth device to record comprises:

in response to the first operation, sending, by the terminal device in a case that the target Bluetooth device supports a hands-free profile (HFP), a microphone recording instruction to the target Bluetooth device to instruct the target Bluetooth device to record.

15. The terminal device according to claim 1, wherein the instructing, by the terminal device in response to a first operation performed by a user on the terminal device, a target Bluetooth device to record comprises:

prompting, by the terminal device in response to the first operation performed by the user on the terminal device, the user whether to record through a microphone of the target Bluetooth device;

receiving, by the terminal device, a second operation performed by the user, wherein the second operation is used for determining to record through the microphone of the target Bluetooth device; and sending, by the terminal device in response to the second operation, the microphone recording instruction to the target Bluetooth device to instruct the target Bluetooth device to record.

16. The terminal device according to claim 1, further comprising:

establishing a synchronous connection oriented (SCO) link between the terminal device and the target Bluetooth device; and receiving, by the terminal device, a response message sent by the target Bluetooth device, wherein the response message is used for indicating that the microphone of the target Bluetooth device is turned on.

17. The terminal device according to claim 1, further comprising:

obtaining, by the terminal device, a first image by capturing through a camera in response to the first operation performed by the user and in a process of obtaining a target audio data stream by recording through the target Bluetooth device; and synthesizing, by the terminal device, the first image and a processed target audio data stream to obtain a first video stream.

18. The terminal device according to claim 1, further comprising:

receiving, by the terminal device, a microphone turn-off request initiated by the first APP, wherein the microphone turn-off request is used for triggering off of the microphone;

detecting, by the terminal device in response to the microphone turn-off request, whether the Bluetooth connection between the terminal device and the target Bluetooth device is maintained;

in a case that the Bluetooth connection between the terminal device and the target Bluetooth device is maintained, interrupting, by the terminal device, the synchronous connection oriented (SCO) link between the terminal device and the target Bluetooth device to trigger the target Bluetooth device to turn off the microphone; and turning off, by the terminal device, the microphone of the terminal device in a case that the Bluetooth connection between the terminal device and the target Bluetooth device is interrupted and the microphone of the terminal device is in the turn-on state.

* * * * *